(12) United States Patent
Ishii et al.

(10) Patent No.: US 9,628,776 B2
(45) Date of Patent: *Apr. 18, 2017

(54) THREE-DIMENSIONAL IMAGING DEVICE, IMAGE PROCESSING DEVICE, IMAGE PROCESSING METHOD, AND IMAGE PROCESSING PROGRAM

(75) Inventors: Yasunori Ishii, Osaka (JP); Masao Hiramoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 412 days.

This patent is subject to a terminal disclaimer.

(21) Appl. No.: 14/004,465

(22) PCT Filed: Apr. 3, 2012

(86) PCT No.: PCT/JP2012/002321
§ 371 (c)(1),
(2), (4) Date: Sep. 11, 2013

(87) PCT Pub. No.: WO2012/137485
PCT Pub. Date: Oct. 11, 2012

(65) Prior Publication Data
US 2013/0342661 A1  Dec. 26, 2013

(30) Foreign Application Priority Data

Apr. 7, 2011 (JP) ................................. 2011-085492

(51) Int. Cl.
*H04N 13/00* (2006.01)
*H04N 9/04* (2006.01)
(Continued)

(52) U.S. Cl.
CPC ......... *H04N 13/0207* (2013.01); *G03B 35/10* (2013.01); *G03B 35/12* (2013.01);
(Continued)

(58) Field of Classification Search
CPC ...... G02B 3/0056; G02B 15/03; G02B 23/12; G02B 26/008; G01S 17/89; H04N 13/0257
(Continued)

(56) References Cited

U.S. PATENT DOCUMENTS

2002/0067560 A1* 6/2002 Jones ...................... G02B 23/12
359/885
2002/0171740 A1* 11/2002 Seo ..................... H04N 13/0257
348/207.99
(Continued)

FOREIGN PATENT DOCUMENTS

CN    101738840 A    6/2010
CN    101902658 A    12/2010
(Continued)

OTHER PUBLICATIONS

International Search Report for corresponding International Application No. PCT/JP2012/002321 mailed Jul. 10, 2012.
(Continued)

*Primary Examiner* — Jorge L Ortiz Criado
*Assistant Examiner* — Daniel Chang
(74) *Attorney, Agent, or Firm* — Renner, Otto, Boissell & Sklar, LLP

(57) ABSTRACT

A 3D image capture device according to an aspect of the present invention includes: a light-transmitting section including N different kinds of first filters (where N is an integer equal to or greater than two) which are arranged so that light rays are incident on those filters in parallel with each other and that the transmittances have mutually different wavelength dependences; an image sensor including N second filters, of which the transmittances have mutually different wavelength dependences; and an image capturing driving section driving the light-transmitting section so that
(Continued)

image capturing sessions are carried out M times sequentially (where M is an integer equal to or greater than N), and that each of the first filters changes its positions from one of N positions that have been set in advance with respect to the image sensor after each time the image capturing session is carried out.

12 Claims, 15 Drawing Sheets

(51) Int. Cl.
   *H04N 9/083* (2006.01)
   *H04N 13/02* (2006.01)
   *G03B 35/12* (2006.01)
   *G03B 35/10* (2006.01)

(52) U.S. Cl.
   CPC ......... *H04N 9/045* (2013.01); *H04N 13/0214* (2013.01); *H04N 13/0217* (2013.01); *H04N 13/0257* (2013.01)

(58) Field of Classification Search
   USPC ............... 348/207.99, 280, 370; 359/885; 396/155; 353/84
   See application file for complete search history.

(56) References Cited

U.S. PATENT DOCUMENTS

| | | | | |
|---|---|---|---|---|
| 2003/0147002 | A1* | 8/2003 | Ray | G01S 17/89 348/370 |
| 2006/0132722 | A1* | 6/2006 | Colpaert | G02B 26/008 353/84 |
| 2009/0284627 | A1 | 11/2009 | Bando et al. | |
| 2009/0290861 | A1* | 11/2009 | Chan | G03B 15/03 396/155 |
| 2010/0066854 | A1 | 3/2010 | Mather et al. | |
| 2010/0128152 | A1* | 5/2010 | Hayasaka | G02B 3/0056 348/280 |

FOREIGN PATENT DOCUMENTS

| | | |
|---|---|---|
| CN | 201740969 U | 2/2011 |
| JP | 02-171737 A | 7/1990 |
| JP | 2002-344999 A | 11/2002 |
| JP | 2003-134533 A | 5/2003 |
| JP | 2007-017536 A | 1/2007 |
| JP | 2009-276294 A | 11/2009 |
| JP | 2010-038788 A | 2/2010 |
| JP | 2010-079298 A | 4/2010 |

OTHER PUBLICATIONS

International Preliminary Report on Patentability for corresponding International Application No. PCT/JP2012/002321 dated May 21, 2013.

Moriue et al., "A Real-time Monocular Stereo System Using a Viewpoint Switching Iris", Transactions of the 27th Annual Conference of the Robotics Society of Japan, 3R2-06, 2009 and English Abstract.

Chinese Office Action and Search Report dated Mar. 30, 2015 for corresponding Chinese Application No. 201280012326.5 with English translation of Search Report.

* cited by examiner (a)

(b)

(c)

(a) ROTATED 0 DEGREES (b) ROTATED 120 DEGREES (c) ROTATED 240 DEGREES

*FIG. 9*

| | COLOR COMPONENT | | |
|---|---|---|---|
| | Cy | Ye | Mg |
| LEFT | Ci1 | Cj2 | Ck3 |
| TOP | Cj1 | Ck2 | Ci3 |
| RIGHT | Ck1 | Ci2 | Cj3 |

FILTER'S POSITION

THREE-DIMENSIONAL IMAGING DEVICE, IMAGE PROCESSING DEVICE, IMAGE PROCESSING METHOD, AND IMAGE PROCESSING PROGRAM

TECHNICAL FIELD

The present application relates to a single-lens 3D image capturing technology for generating multiple images with parallax.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as "multi-viewpoint images") by using a single camera (i.e., single-lens image capturing methods) have been researched and developed. For example, Patent Document No. 1 discloses a technique for obtaining two images with parallax at the same time using color filters. FIG. 16 schematically illustrates an image capturing system that adopts such a technique. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film 21. In the meantime, only red- and blue-based light rays are respectively transmitted through the two color filters 20a and 20b of the light beam confining plate 20. As a result, a magenta-based color image is produced on the photosensitive film 21 by the light rays that have been transmitted through the two color filters. In this case, since the color filters 20a and 20b are arranged at mutually different positions, the image produced on the photosensitive film 21 comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 1, multi-viewpoint images can be produced using the two color filters.

According to the technique disclosed in Patent Document No. 1, the light rays are imaged on the photosensitive film, thereby producing images with parallax there. Meanwhile, Patent Document No. 2 discloses a technique for producing images with parallax by transforming incoming light into electrical signals. FIG. 17 schematically illustrates a light beam confining plate 22 according to such a technique. Specifically according to that technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 3 also discloses a technique for obtaining images with parallax using a similar configuration to the one illustrated in FIG. 17. FIG. 18 schematically illustrates a light beam confining plate 23 as disclosed in Patent Document No. 3. According to that technique, by making the incoming light pass through R, G and B areas 23R, 23G and 23B of the light beam confining plate 23, images with parallax can also be produced.

Patent Document No. 4 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. And by defining corresponding points between those images on a pixel-by-pixel basis, the magnitude of parallax can be calculated. And based on the magnitude of parallax calculated and information about the focal length of the camera, the distance from the camera to the subject can be obtained.

Patent Document No. 5 discloses a technique for obtaining information about a subject distance based on two images that have been generated using either a diaphragm to which two color filters with mutually different aperture sizes (e.g., red and blue filters) are attached or a diaphragm to which two color filters in two different colors are attached horizontally symmetrically with respect to the optical axis. According to such a technique, if light rays that have been transmitted through red and blue color filters with mutually different aperture sizes are observed, the degrees of blur observed vary from one color to another. That is why the degrees of blur of the two images that are associated with the red and blue color filters vary according to the subject distance. By defining corresponding points with respect to those images and comparing their degrees of blur to each other, information about the distance from the camera to the subject can be obtained. On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 1 to 5 mentioned above, images with parallax can be produced by arranging RGB based color filters on a light beam confining plate or a diaphragm. However, since those RGB based color filters are used, the percentage of the incoming light that can be used decreases to about one-third. In addition, to increase the magnitude of parallax produced, those color filters should be arranged at distant positions and should have decreased areas. In that case, however, the percentage of the incoming light that can be used further decreases.

Unlike these conventional techniques, Patent Document No. 6 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received at the image sensor. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 2-171737
Patent Document No. 2: Japanese Laid-Open Patent Publication No. 2002-344999
Patent Document No. 3: Japanese Laid-Open Patent Publication No. 2009-276294
Patent Document No. 4: Japanese Laid-Open Patent Publication No. 2010-38788
Patent Document No. 5: Japanese Laid-Open Patent Publication No. 2010-79298,
Patent Document No. 6: Japanese Laid-Open Patent Publication No. 2003-134533

Non-Patent Literature

Non-Patent Document No. 1: Yuta MORIUE, Takeshi TAKAKI, and Idaku ISHII, A Real-time Monocular Stereo System Using a Viewpoint Switching Iris, Transactions of the 27$^{th}$ Annual Conference of the Robotics Society of Japan, 3R2-06, 2009.

SUMMARY OF INVENTION

Technical Problem

According to none of the techniques disclosed in these Patent Documents No. 1 through 6, multi-viewpoint images can be obtained with the incoming light used highly efficiently.

An embodiment of the present invention provides a 3D image capturing technique, by which multi-viewpoint images can be generated by using the incoming light more efficiently than in the related art.

Solution to Problem

To overcome the problem described above, a 3D image capture device according to an aspect of the present invention includes: a light-transmitting section including N different kinds of first filters (where N is an integer that is equal to or greater than two) which are arranged so that light rays are incident on those filters in parallel with each other and of which the transmittances have mutually different wavelength dependences; an image sensor being arranged so as to receive the light that has been transmitted through the light-transmitting section and including a photosensitive cell array and a filter array that is arranged to face the photosensitive cell array, each of the photosensitive cell array and the filter array being made up of a plurality of unit elements, each of the unit elements including N photosensitive cells and N second filters which are arranged to face the N photosensitive cells and of which the transmittances have mutually different wavelength dependences; an imaging section that produces an image on the imaging area of the image sensor; and an image capturing driving section that drives the light-transmitting section so that image capturing sessions are carried out M times sequentially (where M is an integer that is equal to or greater than N) and that each of the N kinds of first filters changes its positions from one of N positions after another every time the image capturing session is carried out, the N positions having been set in advance with respect to the image sensor.

This general and particular aspect can be implemented as a system, a method, a computer program or a combination thereof.

Advantageous Effects of Invention

A 3D image capture device according to an aspect of the present invention can obtain multi-viewpoint images by using light more efficiently than in the related art.

BRIEF DESCRIPTION OF DRAWINGS

FIG. 9 A table showing relations between the positions of filters arranged in the transmitting areas, color components, and output signals according to the first exemplary embodiment.

DESCRIPTION OF EMBODIMENTS

Figure 1:
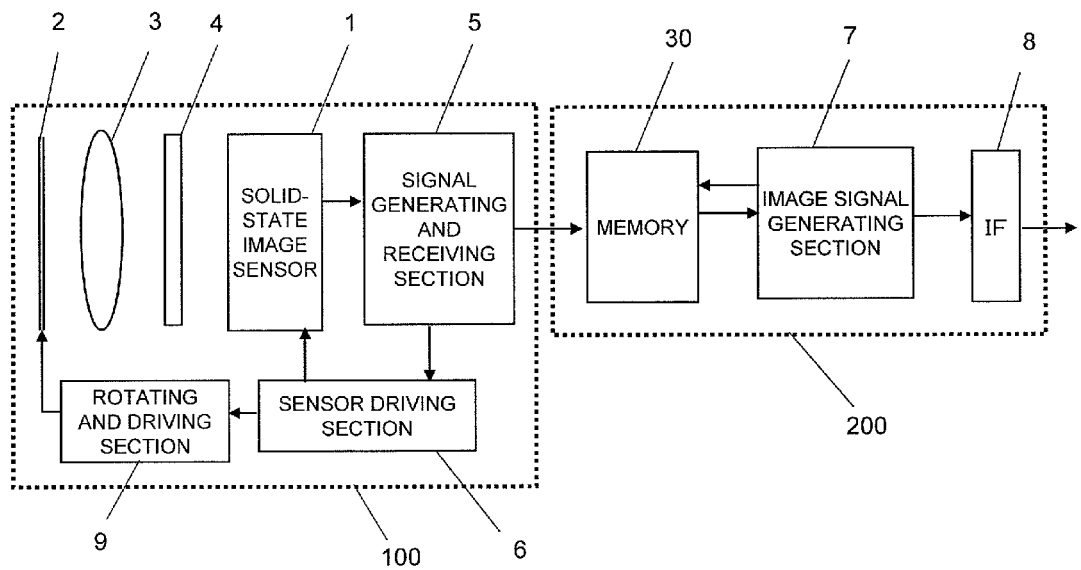
FIG. 1 A block diagram illustrating an overall configuration according to a first exemplary embodiment.

The present invention was perfected based on the following discovery.

According to any of the techniques disclosed in Patent Documents Nos. 1 to 5, multi-viewpoint images can be certainly obtained, but the image sensor cannot use incoming light more efficiently. This is partly because primary color (RGB) based color filters are used. On the other hand, according to the technique disclosed in Patent Document No. 6, a normal image that uses the incoming light highly efficiently can be obtained by using a mechanism that removes a color filter from the optical path by mechanical driving. Even with that technique, however, primary color based color filters are also used to obtain multi-viewpoint images. Consequently, the multi-viewpoint images cannot be obtained with the incoming light used sufficiently efficiently.

Also, when a subject in a chromatic color is going to be shot, the wavelength range of the light reflected from such a subject will be a biased one, and therefore, it is not that light rays with every wavelength will be incident evenly on the image capture device. That is why if a red subject is going to be shot using red and blue color filters, for example, the light reflected from the subject may pass through the red color filter but may not pass through the blue color filter in some situation. As a result, according to the conventional technologies, if the subject is in a chromatic color, multi-viewpoint images could not be obtained properly.

Patent Document No. 3 discloses a technique for generating color images with parallax by obtaining distance information based on the linearity of colors in a situation where a subject in a chromatic color is going to be shot. However, if the subject is in a primary color or if the scene to be shot has no texture, it is difficult to obtain distance information based on the linearity of colors.

Based on these discoveries about problems with the related art, the present inventors perfected our invention. According to an aspect of the present invention, multi-viewpoint images can be generated by using incoming light more efficiently than in the related art.

Embodiments of the present invention are outlined as follows:

(1) A 3D image capture device according to an aspect of the present invention includes: a light-transmitting section including N different kinds of first filters (where N is an integer that is equal to or greater than two) which are arranged so that light rays are incident on those filters in parallel with each other and of which the transmittances have mutually different wavelength dependences; an image sensor being arranged so as to receive the light that has been transmitted through the light-transmitting section and including a photosensitive cell array and a filter array that is arranged to face the photosensitive cell array, each of the photosensitive cell array and the filter array being made up of a plurality of unit elements, each of the unit elements including N photosensitive cells and N second filters which are arranged to face the N photosensitive cells and of which the transmittances have mutually different wavelength dependences; an imaging section that produces an image on the imaging area of the image sensor; and an image capturing driving section that drives the light-transmitting section so that image capturing sessions are carried out M times sequentially (where M is an integer that is equal to or greater than N) and that each of the N kinds of first filters changes its positions from one of N positions after another every time the image capturing session is carried out, the N positions having been set in advance with respect to the image sensor.

(2) In one embodiment, the N kinds of first filters are designed so that a light ray with an arbitrary wavelength, which is included in visible radiation, is transmitted through at least one kind of first filter among the N kinds of first filters, and the at least one kind of first filter has a transmission wavelength range that is broader than the wavelength range of a primary color.

(3) In one embodiment, the 3D image capture device of (1) or (2) includes an image generating section that generates N multi-viewpoint images that are associated with the N positions based on photoelectrically converted signals to be supplied from the N photosensitive cells that are included in each unit element when image capturing sessions are carried out every M times.

(4) In one embodiment of the 3D image capture device of (3), the image generating section generates M×N image signals representing light ray components that have passed through the N positions based on the photoelectrically converted signals to be supplied from the N photosensitive cells that are included in each unit element when image capturing sessions are carried every M times, and synthesizes those N×M image signals generated together, thereby generating N color multi-viewpoint images associated with the N positions.

(5) In one embodiment of the 3D image capture device of one of (1) to (4), three out of the N kinds of first filters have their transmission wavelength ranges designed to agree with three out of colors cyan, magenta, yellow, red, blue and green wavelength ranges.

(6) In one embodiment of the 3D image capture device of one of (1) to (5), N=3, the N kinds of first filters have their transmission wavelength ranges designed to agree with colors cyan, magenta and yellow wavelength ranges, respectively, and the N second filters have their transmission wavelength ranges designed to agree with colors red, blue and green wavelength ranges, respectively.

(7) In one embodiment of the 3D image capture device of one of (1) to (6), in the light-transmitting section, the N kinds of first filters are arranged so that the first filters are all located at the same distance from the center of the light-transmitting section and that there is an equal distance between any two adjacent ones of the first filters.

(8) In one embodiment of the 3D image capture device of one of (1) to (7), the image capturing driving section rotates the light-transmitting section on the center of the light-transmitting section, thereby changing the positions of each of the N kinds of first filters from one of those N positions after another every time an image capturing session is carried out.

(9) An image processor according to an aspect of the present invention generates multi-viewpoint images based on signals that have been obtained by the 3D image capture device of one of (1) to (8). The image processor generates N multi-viewpoint images that are associated with the N positions based on photoelectrically converted signals to be supplied from the N photosensitive cells that are included in each of the unit elements of the image sensor when image capturing sessions are carried every M times.

(10) In one embodiment, the image processor generates M×N image signals representing light ray components that have passed through the N positions based on the photoelectrically converted signals to be supplied from the N photosensitive cells that are included in each of the unit elements when image capturing sessions are carried every M times, and synthesizes those N×M image signals generated together, thereby generating N color multi-viewpoint images associated with the N positions.

(11) An image processing method according to an aspect of the present invention is designed to generate multi-viewpoint images based on signals that have been obtained by the 3D image capture device of one of (1) to (8). The method includes the step of generating N multi-viewpoint images that are associated with the N positions based on photoelectrically converted signals to be supplied from the N photosensitive cells that are included in each unit element of the image sensor when image capturing sessions are carried every M times.

(12) In one embodiment, the step of generating the N multi-viewpoint images includes the steps of: generating m×N image signals representing light ray components that have passed through the N positions based on the photoelectrically converted signals to be supplied from the N photosensitive cells that are included in each of the unit elements when image capturing sessions are carried every M times, and synthesizing those N×M image signals generated together, thereby generating N color multi-viewpoint images associated with the N positions.

(13) An image processing program according to an aspect of the present invention is designed to generate multi-viewpoint images based on signals that have been obtained by the 3D image capture device according to any of the embodiments of the present invention described above. The program is defined to make a computer perform the step of generating N multi-viewpoint images that are associated with the N positions based on photoelectrically converted signals to be supplied from the N photosensitive cells that are included in each of the unit elements of the image sensor when image capturing sessions are carried every M times.

(14) In one embodiment, the step of generating the N multi-viewpoint images includes the steps of: generating M×N image signals representing light ray components that have passed through the N positions based on the photoelectrically converted signals to be supplied from the N photosensitive cells that are included in each of the unit elements when image capturing sessions are carried every M times, and synthesizing those N×M image signals generated together, thereby generating N color multi-viewpoint images associated with the N positions.

Hereinafter, embodiments of the present invention will be described in further detail with reference to the accompanying drawings. In the following description, any element shown in multiple drawings and having the same or similar function will be identified by the same reference numeral. It should be noted that a signal or information representing an image will be sometimes referred to herein as just an "image". Also, in the following description, "over", "left", "right" or any other position related term will be construed herein by the drawing being referred to. In a real world image capture device, however, the direction that the image capture device faces is always changing. That is why any of those position related terms used in this description actually means any of various positions according to which direction the image capture device is now facing.

Embodiment 1

FIG. 1 is a block diagram illustrating an overall configuration for an image capture device as a first embodiment of the present invention. The image capture device of this embodiment is a digital electronic camera and includes an image capturing section 100 and a signal processing section 200 that generates a signal representing an image (i.e., an image signal) based on the signal generated by the image capturing section 100. The image capture device of this embodiment may either generate only a still picture or have the function of generating a moving picture.

The image capturing section 100 includes an image sensor 1 with a number of photosensitive cells (pixels) that are arranged on its imaging area, a light-transmitting plate (light-transmitting section) 2 which has three transmitting areas that have mutually different transmission wavelength ranges and which transmits the incoming light, an optical lens for producing an image on the imaging area of the image sensor, and an infrared cut filter 4. The image capturing section 100 further includes a signal generating and receiving section 5 which not only generates a fundamental signal to drive the image sensor 1 but also receives the output signal of the image sensor 1 and sends it to the signal processing section 200, a sensor driving section 6 for driving the image sensor 1 in accordance with the fundamental signal generated by the signal generating and receiving section 5, and a rotating and driving section 9 which rotates the light-transmitting plate 2. In this embodiment, the rotating and driving section 9 functions as an image capturing driving section according to the present invention.

The image sensor 1 is typically a CCD or CMOS sensor which may be fabricated by known semiconductor device processing technologies. The signal generating and receiving section 5 and the sensor driving section 30 may be implemented as an LSI such as a CCD driver. The rotating and driving section 9 has a motor that rotates the light-transmitting plate 2 and rotates, along with the sensor driving section 6, the light-transmitting plate 2 on its center as the axis of rotation.

The signal processing section 200 includes an image processing section 7 which processes the output signal of the image capturing section 100 to generate an image signal, a memory 30 which stores various kinds of data for use to generate the image signal, and an interface (I/F) section 8 which sends out the image signal thus generated to an external device. The image processing section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image processing section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, the description thereof will be omitted herein because none of them are essential components that would make it difficult to understand how this embodiment works unless they were described in detail.

Next, the configuration of the image capturing section 100 will be described in further detail with reference to FIGS. 2 through 4.

Figure 2:
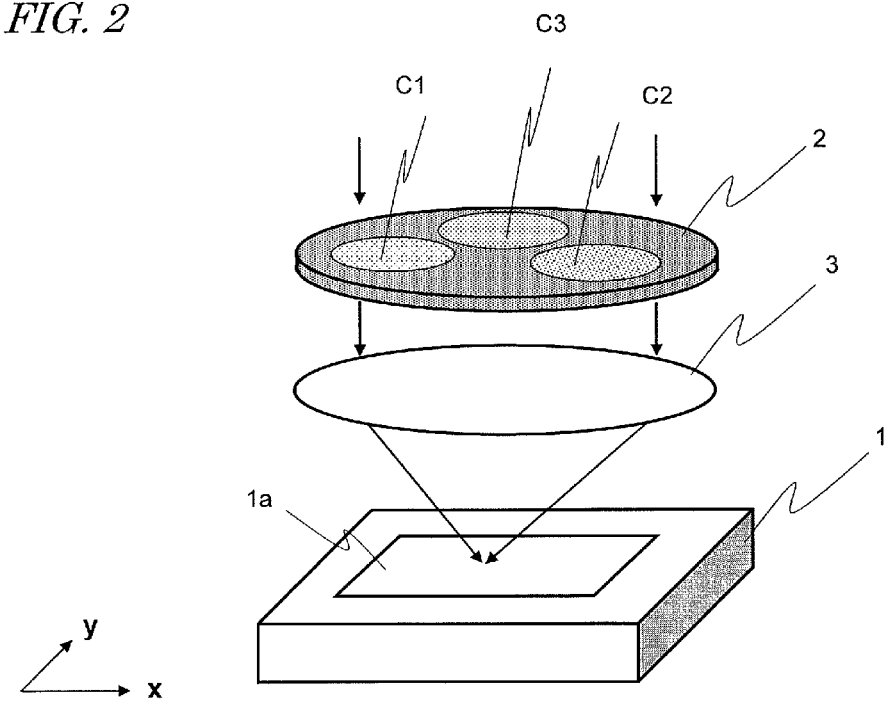
FIG. 2 A schematic representation generally illustrating the relative arrangement of a light-transmitting plate, an optical system and an image sensor according to the first exemplary embodiment.

FIG. 2 schematically illustrates the relative arrangement of the light-transmitting plate 2, the lens 3 and the image sensor 1 in the image capturing section 100. It should be noted that illustration of the other elements is omitted in FIG. 2. The lens 3 may be a lens unit that is a group of lenses but is drawn in FIG. 2 as a single lens for the sake of simplicity. The light-transmitting plate 2 has three transmitting areas C1, C2 and C3 that have mutually different transmission wavelength ranges and transmits the incoming light at least partially. The lens 3 is a known lens and condenses the light that has been transmitted through the light-transmitting plate 2, thereby imaging the light on the imaging area 1a of the image sensor 1. In this embodiment, no light is supposed to be transmitted through the rest of the light-transmitting plate 2 other than those transmitting areas C1, C2 and C3. In the following description, the x and y coordinates shown in FIG. 2 will be used. It should be noted that the arrangement of the respective members shown in FIG. 2 is only an example of the present invention. And the present invention is in no way limited to that specific embodiment. Alternatively, as long as an image can be produced on the imaging area 1a, the lens 3 may be arranged more distant from the image sensor 1 than the light-transmitting plate 2 is. Still alternatively, the lens 3 and the light-transmitting plate 2 may also be implemented as a single optical element.

Figure 3:
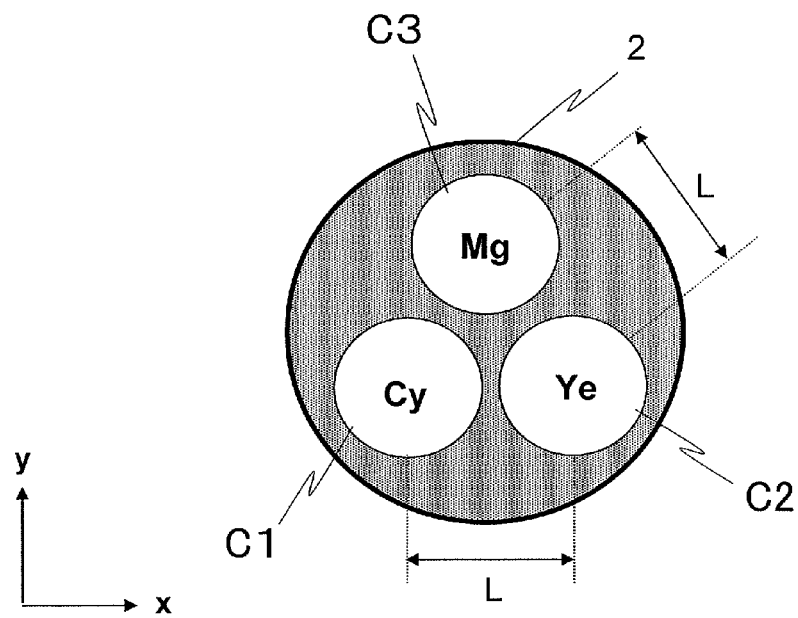
FIG. 3 A view illustrating an arrangement of color filters on a light-transmitting plate according to the first exemplary embodiment.

FIG. 3 is a front view of the light-transmitting plate 2 of this embodiment. The light-transmitting plate 2, as well as the lens 3, has a circular shape in this embodiment but may also have a quadrilateral, hexagonal or any other shape. In the area C1, arranged is a color filter that transmits a light ray falling within the cyan (Cy) wavelength range (i.e., green and blue wavelength ranges). Such a filter will be referred to herein as a "Cy filter". In the area C2, arranged is a color filter that transmits a light ray falling within the yellow (Ye) wavelength range (i.e., red and green wavelength ranges). Such a filter will be referred to herein as a "Ye filter". And in the area C3, arranged is a color filter that transmits a light ray falling within the magenta (Mg) wavelength range (i.e., red and blue wavelength ranges). Such a filter will be referred to herein as an "Mg filter".

It should be noted that as long as these areas C1, C2 and C3 of this embodiment are configured so as to transmit only a light ray falling within the Cy wavelength range, only a light ray falling within the Ye wavelength range, and only a light ray falling within the Mg wavelength range, respectively, and not to transmit a light ray falling within any other wavelength range, the areas C1, C2 and C3 do not have to be color filters but may be any other kind of members. For example, each of these areas C1, C2 and C3 may be a dichroic mirror or any other optical element that transmits a light ray falling within a particular wavelength range and reflects a light ray falling within any other wavelength range. In this example, these areas C1, C2 and C3 are arranged rotationally symmetrically with respect to the center of the light-transmitting plate 2 and have their centers spaced apart from each other by a distance L. In the initiator state, the distance L between these areas is determined by the size of the lens 3 so that the image obtained will have appropriate parallax, and may be set to be within the range of several millimeters to several centimeters, for example.

On the imaging area 1a of the image sensor 1 shown in FIG. 2, there is an array of photosensitive cells that are arranged two-dimensionally and an array of color filters that are arranged to face those photosensitive cells in the array. The array of photosensitive cells and the array of color filters consist of multiple unit elements. And each unit element includes four photosensitive cells and four associated color filters that face them. Each of those photosensitive cells is typically a photodiode, which performs photoelectric conversion and outputs an electrical signal representing the quantity of the light received (which will be referred to herein as a "photoelectrically converted signal" or a "pixel signal"). On the other hand, each color filter may be made of a known pigment and is designed so as to selectively transmit a light ray falling within a particular wavelength range.

Figure 4:
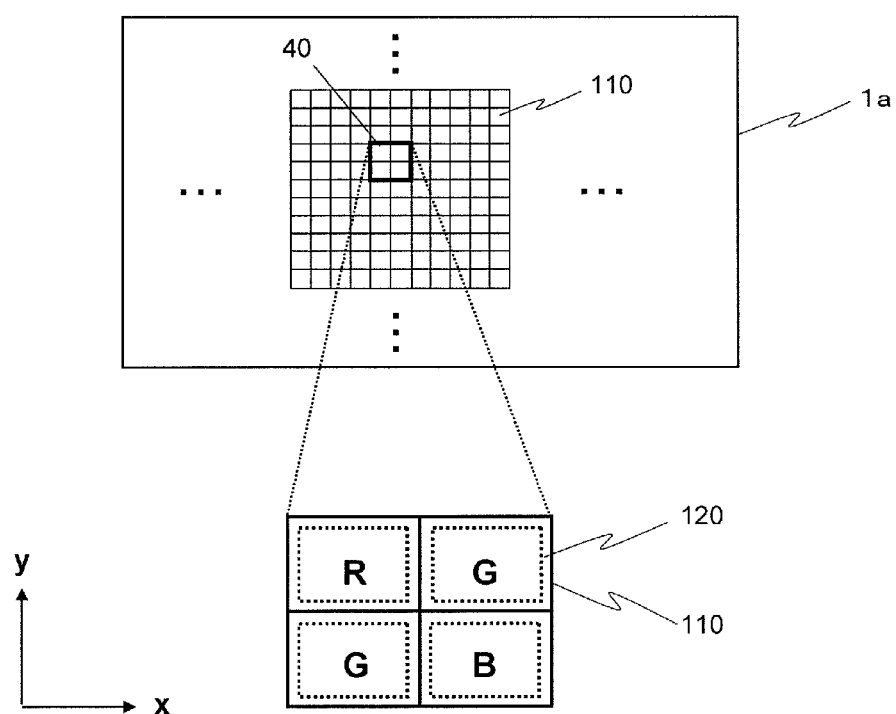
FIG. 4 A view illustrating the basic arrangement of color filters in an image sensor according to the first exemplary embodiment.

FIG. 4 schematically illustrates a part of the array of color filters according to this embodiment. As shown in FIG. 4, a lot of color filters 110 are arranged in columns and rows on the imaging area 1a. Four color filters 110 that are arranged close to each other and four photosensitive cells 120 that face them form one unit element 40. In each unit element 40, a color filter that transmits a light ray falling within the red (R) wavelength range (i.e., an R filter) is arranged at the row 1, column 1 position, color filters that transmit a light ray falling within the green (G) wavelength range (i.e., G filters) are arranged at the row 1, column 2 position and at the row 2, column 1 position, and a color filter that transmits a light ray falling within the blue (B) wavelength range (i.e., a B filter) is arranged at the row 2, column 2 position. As can be seen, the arrangement of the color filters 110 according to this embodiment is a known Bayer arrangement consisting basically of two rows and two columns. However, the photosensitive cells 120 and the color filters 110 do not have to have the Bayer arrangement but may also have any other known arrangement. For example, those pixels may also be arranged in an oblique lattice pattern by rotating the pixel arrangement shown in FIG. 4 45 degrees on a normal to the paper on which FIG. 4 is drawn. Also, the number of photosensitive cells 120 included in each unit element does not have to be four but just needs to be equal to or greater than the number of light-transmitting areas of the light-transmitting plate 2 (i.e., three in this embodiment).

By adopting such an arrangement, the light that has entered this image capture device during an exposure process passes through the light-transmitting plate 2, the lens 3, the infrared cut filter 4 and the color filters 110 and then is incident on the photosensitive cells 120. Each of those photosensitive cells receives a light ray that has been transmitted through the area C1, C2 or C3 of the light-transmitting plate 2 and then through its associated color filter 110, and outputs a photoelectrically converted signal representing the quantity of the light received. The photoelectrically converted signal that has been output from each photosensitive cell is sent to the signal processing section 200 by way of the signal generating and receiving section 5. In the signal processing section 200, the image generating section 7 generates multiple color images with parallax based on the signals supplied from the image capturing section 100.

Figure 5:
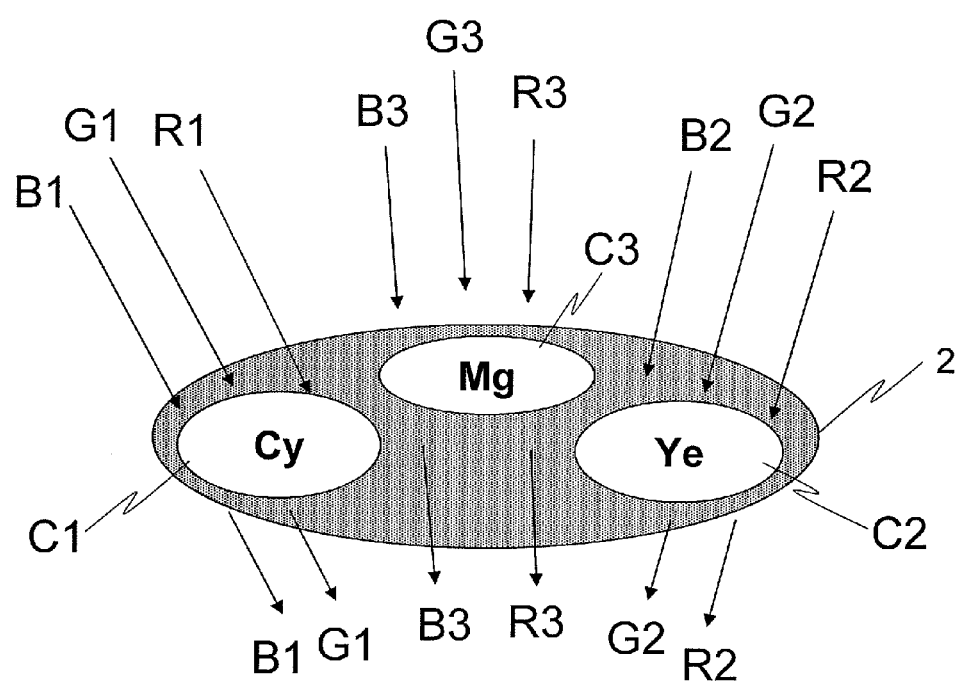
FIG. 5 A schematic representation illustrating what light rays enter and are transmitted through the light-transmitting plate 2 according to the first exemplary embodiment.
Figure 5:
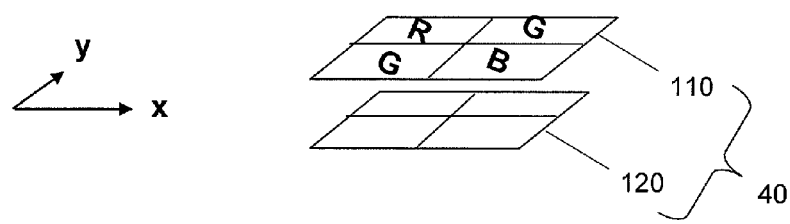

FIG. 5 schematically illustrates the relations between light rays that have entered the light-transmitting plate 2 and light rays that have been transmitted through the light-transmitting plate 2. If the respective color filters in the three transmitting areas C1, C2 and C3 and the respective color filters 110 included in each unit element 40 are supposed to be all transparent, then light rays R1, R2 and R3 representing the color red component, light rays G1, G2 and G3 representing the color green component, and light rays B1, B2 and B3 representing the color blue component are incident on the respective photosensitive cells 120 included in each unit element 40. In this case, R1, G1 and B1 are light rays that have entered the area C1, R2, G2 and B2 are light rays that have entered the area C2, and R3, G3 and B3 are light rays that have entered the area C3. It should be noted that the colors red, green and blue components respectively mean the long, middle and short wavelength ranges if the visible radiation wavelength range (of approximately 400 nm to approximately 700 nm) is divided into three. Since the size of a single unit element 40 is much smaller than (e.g., a ten millionth or less of) the overall size of the imaging area 1a, light with the same spectral distribution is supposed to be incident on each of the four photosensitive cells 120. In the following description, these reference signs R1, G1, B1, R2, G2, B2, R3, G3 and B3 will be sometimes used as signs representing the quantities of light.

Actually, in the areas C1, C2 and C3, arranged are Cy, Ye and Mg filters, respectively. That is why the light rays transmitted through the area C1 are G1 and B1, the light rays transmitted through the area C2 are R2 and G2, and the light rays transmitted through the area C3 are R3 and B3. In addition, one of R, G and B filters is arranged to face each photosensitive cell 120. Consequently, the photosensitive cell (R pixel) that faces the R filter receives R2 and R3, the photosensitive cell (G pixel) that faces the G filter receives G1 and G2, and the photosensitive cell (B pixel) that faces the B filter receives B1 and B3.

In this manner, each photosensitive cell 120 receives light rays representing a color component that have been transmitted through the transmitting areas C1, C2 and C3 and then transmitted through its associated color filter(s). Each photosensitive cell 120 outputs a photoelectrically converted signal representing the quantity of light received. And by performing arithmetic processing based on these photoelectrically converted signals, three multi-viewpoint images corresponding to the respective positions of the three transmitting areas C1, C2 and C3 can be generated.

Hereinafter, it will be described how the arithmetic processing is carried out based on the photoelectrically converted signals supplied from the respective photosensitive cells.

The wavelength dependences of the transmittances (i.e., the spectral transmittances) of the three color filters at the transmitting areas C1, C2 and C3 and the four color filters 110 included in each unit element 40 may sometimes slightly deviate from ideal ones. In addition, the incoming light will also attenuate when passing through the lens 3 and the infrared cut filter 4 albeit slightly. Thus, with those deviations and attenuation taken into account, the image signal generating section 7 of this embodiment performs the following arithmetic operations:

First of all, with attention paid to a single unit element 40, signals representing the respective intensities of light ray components to be transmitted through the areas C1, C2 and C3 of the light-transmitting plate 2 and then incident on that unit element 40 on the supposition that none of the color filters Cy, Mg, Ye, R, G and B exist will be identified herein by $Ci1$, $Ci2$ and $Ci3$, respectively, with a subscript "i" added thereto. That is to say, $Ci1$ represents the combined light intensity of B1 and C1 rays, $Ci2$ represents the combined light intensity of R2 and G2 rays, and $Ci3$ represents the combined light intensity of R3 and B3 rays.

Also, the spectral transmittance of the lens 3 and the infrared cut filter 4 combined will be identified herein by Tw. And the spectral transmittances of the Cy, Ye and Mg filters will be identified herein by Tcy, Tye, and Tmg, respectively. In the same way, the spectral transmittances of the R, G and B color filters will be identified herein by Tr, Tg and Tb, respectively. In this case, Tw, Tcy, Tye, Tmg, Tr, Tg and Tb are functions that depend on the wavelength λ of the incoming light. Also, signals representing the intensities of light rays that have been transmitted through the R, G and B color filters 110 and then received by photosensitive cells 120 right under those color filters 110 will be identified herein by Rs, Gs and Bs, respectively, with a subscript "s" added. Furthermore, the integration operation of the spectral transmittances in the visible radiation wavelength range will be identified herein by the sign Σ. For example, an integration operation $\int TwTcyTrd\lambda$ with respect to the wavelength λ will be identified herein by ΣTwTcyTr. In this case, the integration is supposed to be performed in the entire visible radiation wavelength range.

Then, Rs is proportional to the sum of Ci1ΣTwTcyTr, Ci2ΣTwTyeTr and Ci3ΣTwTmgTr. Likewise, Gs is proportional to the sum of Ci1ΣTwTcyTg, Ci2ΣTwTyeTg and Ci3ΣTwTmgTg. And Bs is proportional to the sum of Ci1ΣTwTcyTb, Ci2ΣTwTyeTb and Ci3ΣTwTmgTb. Supposing the constant of proportionality with respect to these relations is one, Rs, Gs and Bs can be represented by the following Equations (1), (2) and (3), respectively:

$$Rs = Ci1\Sigma TwTcyTr + Ci2\Sigma TwTyeTr + Ci3\Sigma TwTmgTr \quad (1)$$

$$Gs = Ci1\Sigma TwTcyTg + Ci2\Sigma TwTyeTg + Ci3\Sigma TwTmgTg \quad (2)$$

$$Bs = Ci1\Sigma TwTcyTb + Ci2\Sigma TwTyeTb + Ci3\Sigma TwTmgTb \quad (3)$$

If ΣTwTcyTr, ΣTwTyeTr and ΣTwTmgTr of Equation (1) are represented by Mx11, Mx12 and Mx13, respectively, and if ΣTwTcyTg, ΣTwTyeTg and ΣTwTmgTg of Equation (2) are represented by Mx21, Mx22 and Mx23, respectively, and if ΣTwTcyTb, ΣTwTyeTb and ΣTwTmgTb of Equation (3) are represented by Mx31, Mx32 and Mx33, respectively, then the relation between Rs, Gs and Bs and Ci1, Ci2 and Ci3 can be given as a matrix by the following Equation (4):

$$\begin{pmatrix} Rs \\ Gs \\ Bs \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Ci1 \\ Ci2 \\ Ci3 \end{pmatrix} \quad (4)$$

Supposing the respective elements of an inverse matrix, which is obtained by inverting the matrix consisting of the elements Mx11 through Mx33 as represented by Equation (4), are identified by iM11 through iM33, respectively, Equation (4) can be modified into the following Equation (5). That is to say, the signals Ci1, Ci2 and Ci3 representing the intensities of the Cy, Ye and Mg components included in the light rays that have been incident on the areas C1, C2 and C3 can be represented by using the photoelectrically converted signals Rs, Gs and Bs and information about the known spectral transmittances:

$$\begin{pmatrix} Ci1 \\ Ci2 \\ Ci3 \end{pmatrix} = \begin{pmatrix} iM11 & iM12 & iM13 \\ iM21 & iM22 & iM23 \\ iM31 & iM32 & iM33 \end{pmatrix} \begin{pmatrix} Rs \\ Gs \\ Bs \end{pmatrix} \quad (5)$$

The image generating section 7 carries out a signal arithmetic operation based on this Equation (5), thereby generating signals Ci1, Ci2 and Ci3 on a unit element basis. These signals Ci1, Ci2 and Ci3 that have been generated on a unit element basis represent three images that have been produced by the Cy, Ye and Mg component light rays incident on the areas C1, C2 and C3, respectively.

The image signals Ci1, Ci2 and Ci3 that have been obtained through the processing described above are represented by photoelectrically converted signals Rs, Gs and Bs but do not represent color images. But these image signals Ci1, Ci2 and Ci3 correspond to grayscale images representing the intensities of the light rays that have entered the areas C1, C2 and C3 and that fall within wavelength ranges where the light rays are transmitted through the respective areas. Also, the three images represented by the signals Ci1, Ci2 and Ci3 correspond to images to be generated when the subject is viewed from the areas C1, C2 and C3, respectively, and are multi-viewpoint images.

When an ordinary scene is going to be shot, there is a subject in a chromatic color. Or the spectral distribution of the light emitted from a light source is not necessarily a uniform one like that of sunlight. The quantity of light reflected from a subject is obtained by performing an integration operation on the spectral distribution of the light emitted from the light source and the spectral reflectance of the subject. That is why even if the subject is in an achromatic color but if the light emitted from the light source has a biased spectral distribution, the spectral distribution of the light reflected from the subject will also be a biased one. If the spectral distribution of the light emitted from the light source is uniform and if a subject in an achromatic color is going to be shot, ideally R1, G1 and B1 shown in FIG. 5 come to have the same value. Likewise, R2, G2 and B2 also come to have the same value, so do R3, G3 and B3. Consequently, the sum of the intensities G1+B1 of the light rays that have passed through the Cy filter is equal to that of the intensities R2+G2 of the light rays that have passed through the Ye filter.

However, if the spectral distribution of the light emitted from the light source is biased and if a subject is in a chromatic color, then G1+B1, R2+G2 and R3+B3 will have mutually different values even when the light rays are reflected from the same point on the subject in the three-dimensional real world. For example, if the subject is in red, G1+B1=0 and R2+G2=R2 are satisfied. But since R2≠0, G1+B1≠R2+G2.

In this case, if the color filters are arranged on the light-transmitting plate 2 as shown in FIG. 3, the signals Ci1, Ci2 and Ci3 obtained by making calculations of Equation (5) correspond to an Mg component image produced by viewing the subject from the top (i.e., from the position of C3), a Cy component image produced by viewing the subject from the left (i.e., from the position of C1), and a Ye component image produced by viewing the subject from the right (i.e., from the position of Ye), respectively. That is why the signals Ci1, Ci2 and Ci3 can be regarded as representing images obtained by separating the subject's color into complementary colors and as representing images viewed from multiple different viewpoints.

Figure 6:
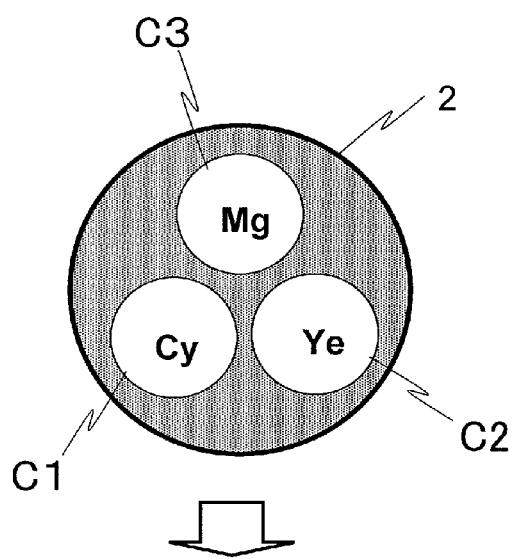
FIG. 6 Illustrates how the light-transmitting plate may be rotated in the first exemplary embodiment.
Figure 6:
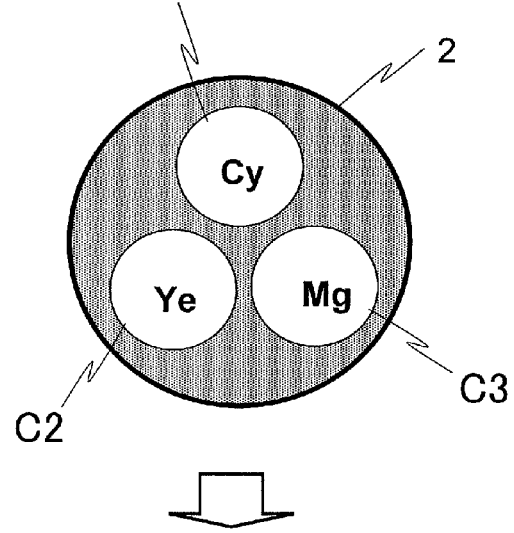
Figure 6:
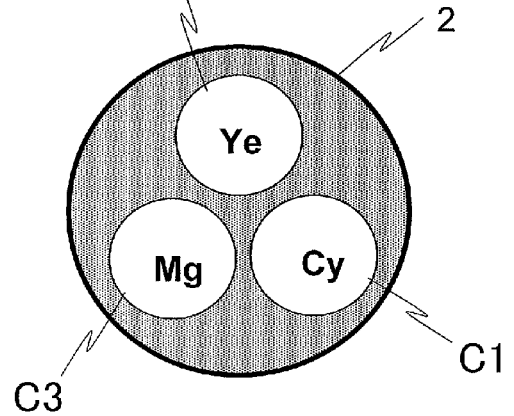

Thus, according to this embodiment, three images are shot by rotating the light-transmitting plate 2 shown in FIG. 3 as shown in portions (a), (b) and (c) of FIG. 6, and multi-viewpoint images are generated and synthesized together through arithmetic processing, thereby generating multiple color images with parallax. Specifically, as disclosed in Non-Patent Document No. 1, the light-transmitting plate 2 may be rotated by putting a belt on the light-transmitting plate 2 and by running the belt with a motor. The rotating and driving section 9 rotates the light-transmitting plate 2 using such a mechanism and the image sensor 1 obtains image signals in the states shown in portions (a), (b) and (c) of FIG. 6. In the following description, the signals corresponding to Ci1, Ci2 and Ci3 of Equation (5) in the respective states shown in FIGS. 6(a) and 6(b) will be identified by Cj1, Cj2, Cj3 and Ck1, Ck2, Ck3, respectively.

First, in State 1 shown in portion (a) of FIG. 6, image signals Ci1, Ci2 and Ci3 are calculated by performing arithmetic operations based on Equation (5). Next, the light-transmitting plate 2 is rotated 120 degrees to change its states into State 2 shown in portion (b) of FIG. 6, in which image signals Cj1, Cj2 and Cj3 are calculated in the same way. Finally, the light-transmitting plate 2 is further rotated 120 degrees to change its states into State 3 shown in portion (c) of FIG. 6, in which image signals Ck1, Ck2 and Ck3 are calculated in the same way.

Figure 7:
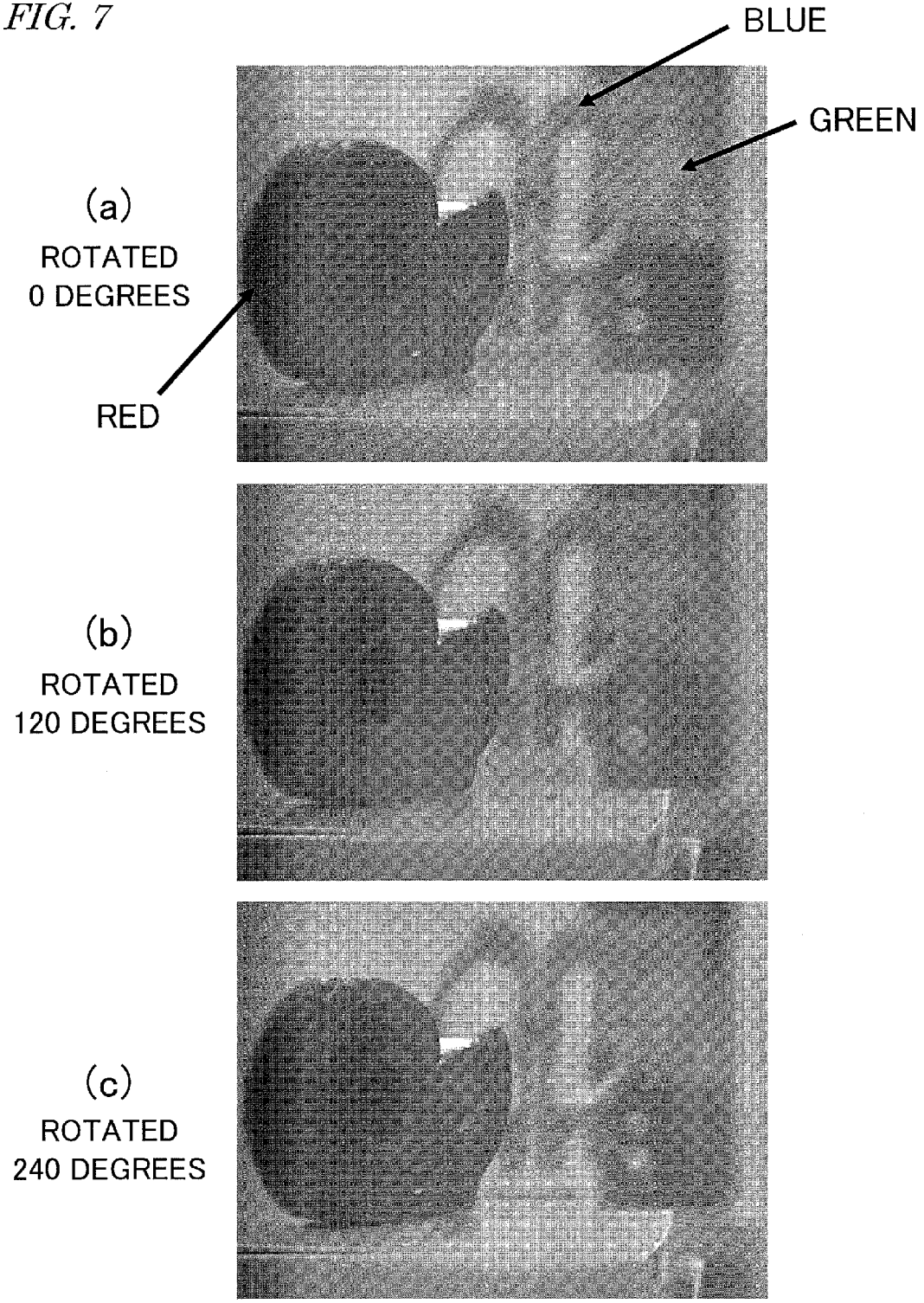
FIG. 7 Shows three exemplary color images that have been shot by rotating the light-transmitting plate in the first exemplary embodiment.

FIG. 7 shows three color images corresponding to the respective states which have been generated based on the image signals calculated as described above. Specifically, FIG. 7(a) shows a color image which has been shot using the image signals Ci1, Ci2 and Ci3 obtained in the initial State 1 as Cy, Ye and Mg components, respectively. FIG. 7(b) shows a color image which has been shot using the image signals Cj1, Cj2 and Cj3 obtained in State 2 at an angle of rotation of 120 degrees from the initial state as Cy, Ye and Mg components, respectively. And FIG. 7(c) shows a color image which has been shot using the image signals Ck1, Ck2 and Ck3 obtained in State 3 at an angle of rotation of 240 degrees from the initial state as Cy, Ye and Mg components, respectively. In the respective images shown in FIG. 7, the subject on the left-hand side is in red, the subject around the center is in blue, and the subject on the upper right side is in green. The subject on the left-hand side is located closest to the shooter and the subject on the right-hand side is located most distant from the shooter. None of these three images shown in FIG. 7 include parallax information.

Figure 8:
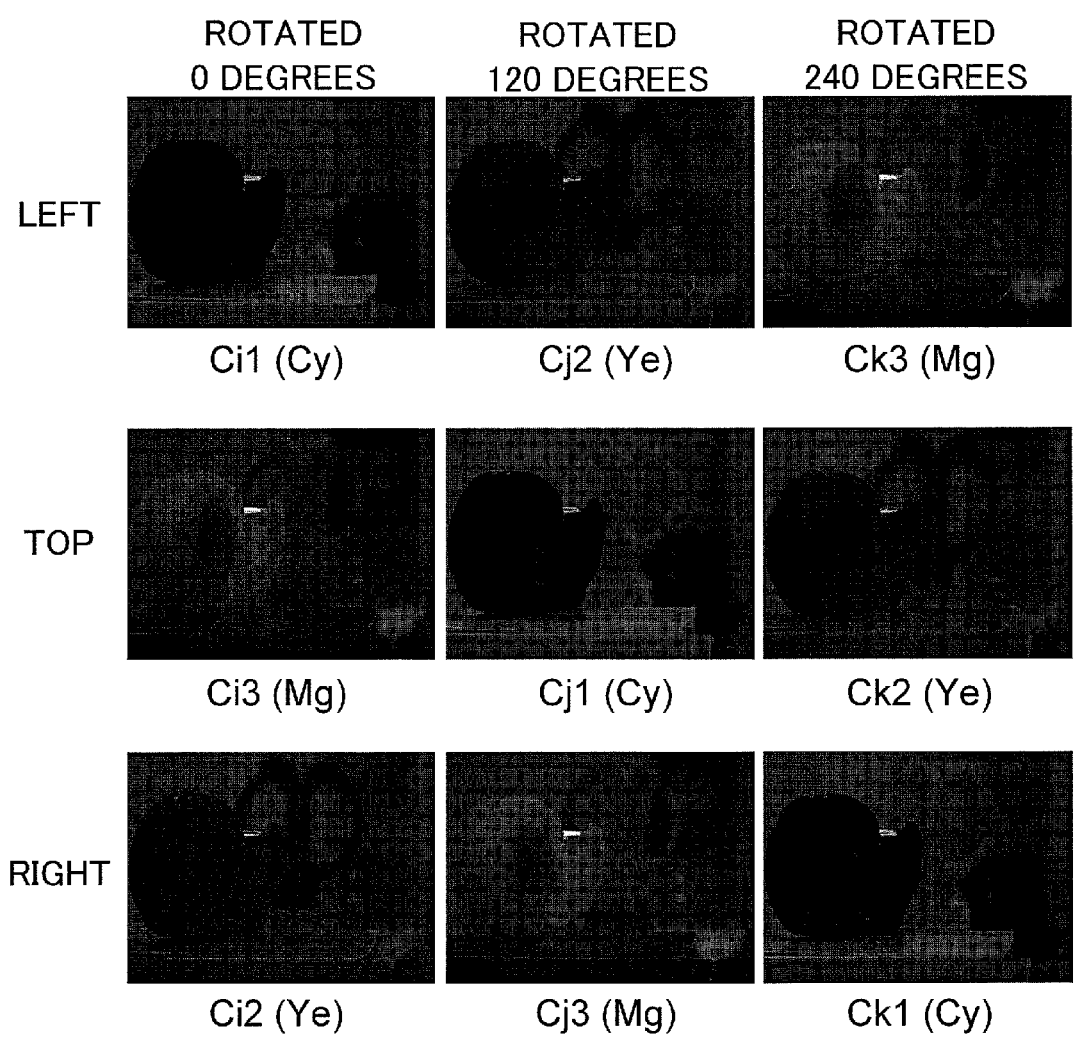
FIG. 8 Shows exemplary images which have been produced by light ray components that have passed through respective transmitting areas and which have been generated based on the images shot according to the first exemplary embodiment.

FIG. 8 shows examples in which Ci1, Ci2, Ci3, Cj1, Cj2, Cj3, Ck1, Ck2, and Ck3 that have been calculated based on Rs, Gs and Bs signals by arithmetic processing are displayed as images with respect to the images shown in FIG. 7. In FIG. 8, the first, second and third columns shows shade images that have been produced by light rays transmitted through the light-transmitting plate 2 at respective positions (left, top and right) in States 1 (at an angle of rotation of 0 degrees), 2 (at an angle of rotation of 120 degrees) and 3 (at an angle of rotation of 240 degrees), respectively. FIG. 9 is a table showing to what image signals combinations of respective positions on the light-transmitting plate 2 and respective color components correspond. In the table shown in FIG. 9, shown horizontally are the color components of color filters arranged in respective transmitting areas and shown vertically are the respective positions of the color filters on the light-transmitting plate 2. As shown in FIG. 8, the number of image components to be calculated based on the three images that have been shot with the light-transmitting plate 2 rotated is nine (=three positions×three color components). In this case, the Cy, Ye and Mg components of the light ray transmitted through the left-hand-side portion of the light-transmitting plate 2 correspond to Ci1, Cj2 and Ck3, respectively. That is why if a color image is synthesized based on these image signals Ci1, Cj2 and Ck3, a color image of the subject as viewed from the left hand side can be obtained. In the same way, by using Ck1, Ci2 and Cj3, a color image of the subject as viewed from the right hand side can be obtained. And by using Cj1, Ck2 and Ci3, a color image of the subject as viewed from the top can be obtained.

Hereinafter, it will be described how to obtain respective color images from multiple different viewpoints. A color image of the subject as viewed from the left-hand side is calculated by the following Equation (6), which is obtained by modifying Equation (4). In this case, signal representing the red, green and blue components of the color image are identified by Rs1, Gs1 and Bs1, respectively:

$$\begin{pmatrix} Rs1 \\ Gs1 \\ Bs1 \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Ci1 \\ Cj2 \\ Ck3 \end{pmatrix} \quad (6)$$

In this Equation (6), the signals Ci1, Ci2 and Ci3 representing the intensities of light rays transmitted through the areas C1, C2 and C3 in Equation (4) are replaced with Ci1, Cj2 and Ck3. In this case, Ci2 and Cj2 both use a filter in the same color (i.e., Ye filter) but are associated with mutually different viewpoints to view the subject from. As shown in FIG. 9, Ci2 represents an image of the subject as viewed from the right-hand side, but Cj2 represents an image of the subject as viewed from the left-hand side. The same can be said about the difference between Ci3 and Ck3. Specifically, Ci3 represents an Mg component image of the subject as viewed from the top, but Ck3 represents an Mg component image of the subject as viewed from the left-hand side.

On the other hand, in Equation (6), Mx11 through Mx33 have no information about the direction from which light is coming. Instead, Mx11 through Mx33 have information about the spectral transmittances of the Cy, Ye and Mg color filters of the light-transmitting plate 2, the spectral transmittances of R, G and B color filters of the image sensor 1, and the spectral transmittances of an IR filter, lenses and other optical elements. That is to say, Mx11 represents the integrated value of the respective spectral transmittances of the Cy and R filters. Mx12 represents the integrated value of the respective spectral transmittances of the Ye and R filters. And Mx13 represents the integrated value of the respective spectral transmittances of the Mg and R filters. Mx11 through Mx33 are known pieces of information to be determined when the image capture device is manufactured.

The Rs1 value obtained by Equation (6) is calculated by adding together the product of Mx11 and the intensity Ci1 of the light ray to pass through the Cy filter, the product of Mx12 and the intensity Cj2 of the light ray to pass through the Ye filter, and the product of Mx13 and the intensity Ck3 of the light ray to pass through the Mg filter in the direction in which the subject is viewed from the left-hand side. The Gs1 and Bs1 values can also be obtained in the same way. This means that by performing the inverse operation of the arithmetic processing of calculating complementary color based signals associated with multiple different viewpoints based on the pixel signals Rs, Gs and Bs in a situation where light rays have come from multiple different directions, the pixel signals Rs1, Gs1 and Bs1 in a situation where light rays have come from the same direction can be obtained based on the three kinds of complementary color based signals associated with the same viewpoint.

In the same way, if the red, blue and blue components of the color image are identified by Rs2, Gs2 and Bs2, respectively, a color image of the subject as viewed from the right-hand side is calculated by the following Equation (7):

$$\begin{pmatrix} Rs2 \\ Gs2 \\ Bs2 \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Ck1 \\ Ci2 \\ Cj3 \end{pmatrix} \quad (7)$$

Also, if the red, blue and blue components of the color image are identified by Rs3, Gs3 and Bs3, respectively, a color image of the subject as viewed from the top is calculated by the following Equation (8):

$$\begin{pmatrix} Rs3 \\ Gs3 \\ Bs3 \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Cj1 \\ Ck2 \\ Ci3 \end{pmatrix} \quad (8)$$

As described above, by shooting images with the light-transmitting plate 2 rotated three times and by calculating the intensities of light rays transmitted through the transmitting areas C1, C2 and C3 of the light-transmitting plate 2 through arithmetic processing on the respective images shot, color images with parallax can be generated. According to this embodiment, images obtained through three sessions are synthesized together by using complementary color (Cy, Ye, Mg) color filters for the light-transmitting portions of the light-transmitting plate 2. As a result, the incoming light can be used more efficiently, and the image capturing sensitivity can be improved, compared to the related art. In addition, since no matching processing is carried out by using the color linearity as disclosed in Patent Document No. 3, multi-viewpoint images can be generated with good stability without depending on the degree of blur or planarity of the image.

Figure 10:
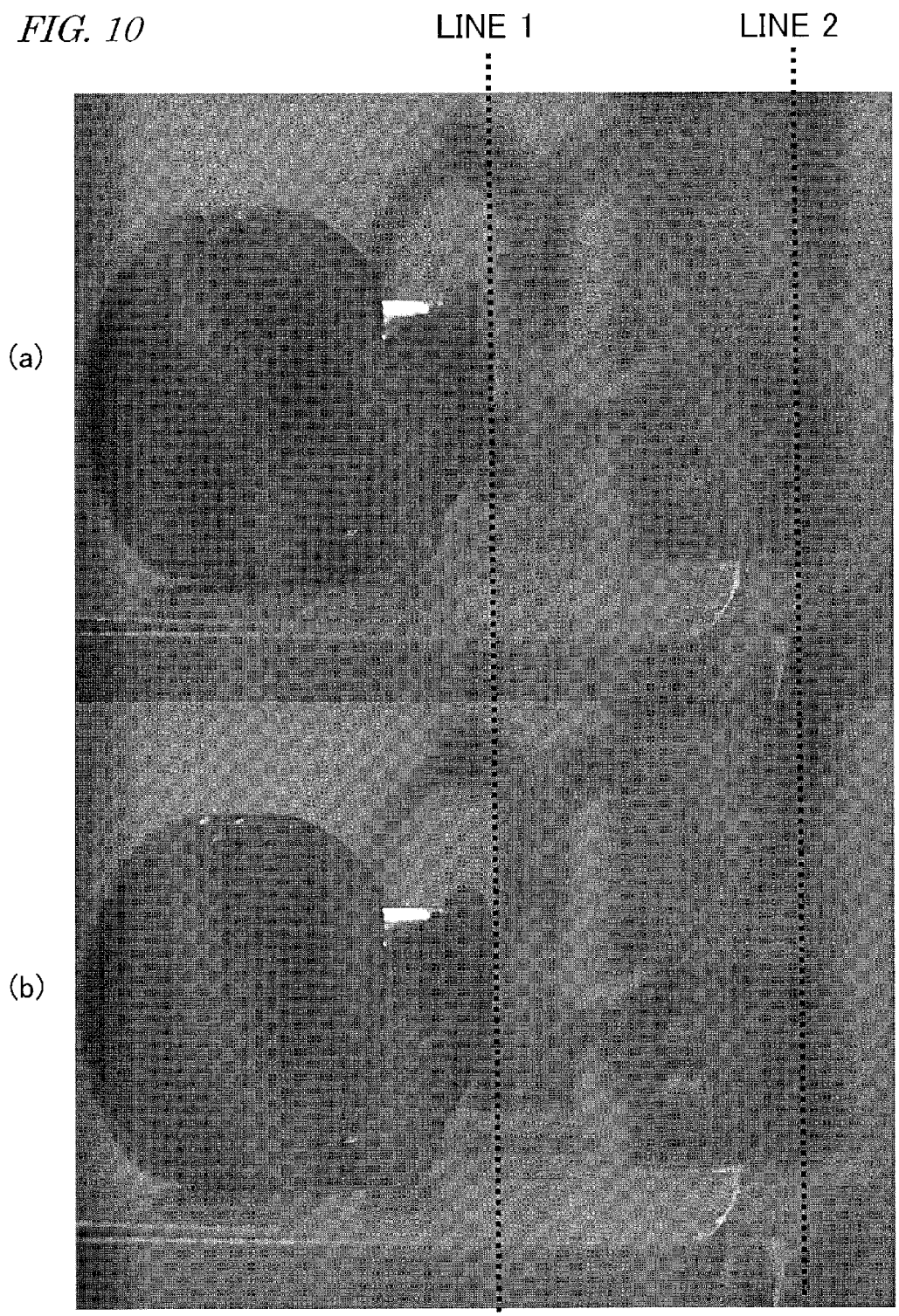
FIG. 10 Shows an image with parallax which has been calculated by a method according to the first exemplary embodiment.

Exemplary images that have been generated through this processing are shown in FIG. 10. Portions (a) and (b) of FIG. 10 show color images that have been generated by viewing the subject from the left and from the right, respectively. It should be noted that no color image generated by viewing the subject from the top is shown in FIG. 10. The two dotted lines 1 and 2 shown in FIG. 10 indicate the same x coordinate on these two images. Specifically, Line 1 is drawn along the contour of the red subject located close at hand, while Line 2 is drawn along the contour of the green subject located in the depth. As can be seen from this example, the x coordinates indicating the contour of the subject located close at hand have substantially the same values, but the x coordinates indicating the contour of the green subject in the depth have different values. Thus, it can be seen that images that look different depending on the distance, i.e., multi-viewpoint images, have been obtained.

According to this embodiment, the transmitting areas do not have to be arranged at those positions on the light-transmitting plate 2 but may be arranged at any arbitrary positions. Ideally, however, those transmitting areas are suitably arranged at the same distance from the center of the light-transmitting plate 2 that is defined as the origin. In that case, it is easy to estimate the direction in which parallax should appear with the center of the light-transmitting plate 2 defined to be the origin. Furthermore, the distances between adjacent transmitting areas are suitably equal to each other. Specifically, the line that passes through the area C1 and the origin and the line that passes through the area C2 and the origin suitably form an angle of 120 degrees between them. Likewise, the line that passes through the area C2 and the origin and the line that passes through the area C3 and the origin suitably form an angle of 120 degrees between them. And the line that passes through the area C3 and the origin and the line that passes through the area C3 and the origin suitably form an angle of 120 degrees between them. By adopting such a configuration, the angle of rotation of the light-transmitting plate 2 can be made constant, and therefore, the mechanism can be controlled more easily and with more stability.

In the embodiment described above, the Cy, Ye and Mg filters are supposed to be arranged in the transmitting areas C1, C2 and C3, respectively, on the light-transmitting plate 2. However, this is just an example and such an arrangement does not always have to be adopted. Optionally, the kinds of color filters to be arranged in those transmitting areas C1, C2 and C3 may be appropriately selected. Those color filters may naturally be primary color filters (such as R, G and B filters). Alternatively, in order to use the incoming light more efficiently, a transmitting filter which transmits a light ray falling within a broader wavelength range than that of a primary color may be arranged in at least one transmitting area. For example, a complementary color based filter may be arranged in one of the three transmitting areas, and primary color based filters may be arranged in the other two transmitting areas. In any case, as long as the transmittances of the three transmitting areas have mutually different wavelength dependences, the same processing as that of this embodiment is applicable. Also, as long as the spectral transmittances of the respective transmitting areas are designed so that a light ray with an arbitrary wavelength included in the visible radiation can be transmitted through any of the transmitting areas, good color multi-viewpoint images can be generated. Furthermore, the color filters 110 included in a single unit element 40 of the image sensor 1 do not have to be R, G and B color filters, and the same processing as that of this embodiment is applicable as long as the wavelength dependences of the transmittances are different from each other.

Embodiment 2

Hereinafter, a second embodiment of the present invention will be described. The image capture device of this embodiment has a different number of filters on the light-transmitting plate 2 from the image capture device of the first embodiment described above. Thus, the following description of this second embodiment will be focused on differences from the first embodiment, and their common features will not be described all over again to avoid redundancies.

The light-transmitting plate 2 does not have to include three filters but may include any other number of filters as long as there are at least two filters. Hereinafter, a configuration for generating multi-viewpoint images in a situation where the number of kinds of filters is generalized into N (where N is an integer that is equal to or greater than two) will be described. As a premise, shooting is supposed to be performed by rotating the light-transmitting plate 2, including N kinds of filters of which the transmittances have mutually different wavelength dependences, N times or more. Also, each unit element 40 of the image sensor 1 is supposed to include N color filters, of which the spectral transmittances are different from each other, and N photosensitive cells which face those color filters.

Figure 11A:
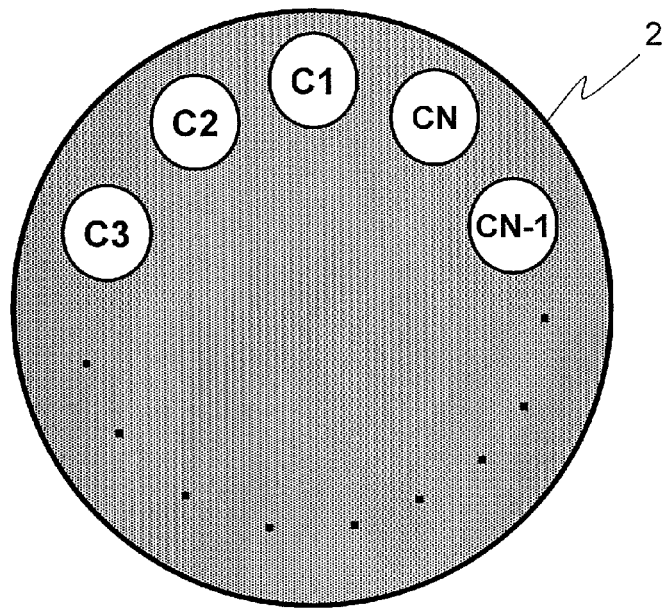
FIG. 11A Illustrates an exemplary light-transmitting plate according to a second exemplary embodiment.

FIG. 11A illustrates an example of such a generalized light-transmitting plate 2. The light-transmitting plate 2 shown in FIG. 11A includes N filters C1 through CN which are arranged so that light is incident on them in parallel with each other and of which the transmittances have mutually different wavelength dependences. These filters C1 through CN are supposed to be located at the same distance from the center of the light-transmitting plate 2 and the distance between each pair of adjacent transmitting areas is supposed to be the same everywhere.

Figure 11B:
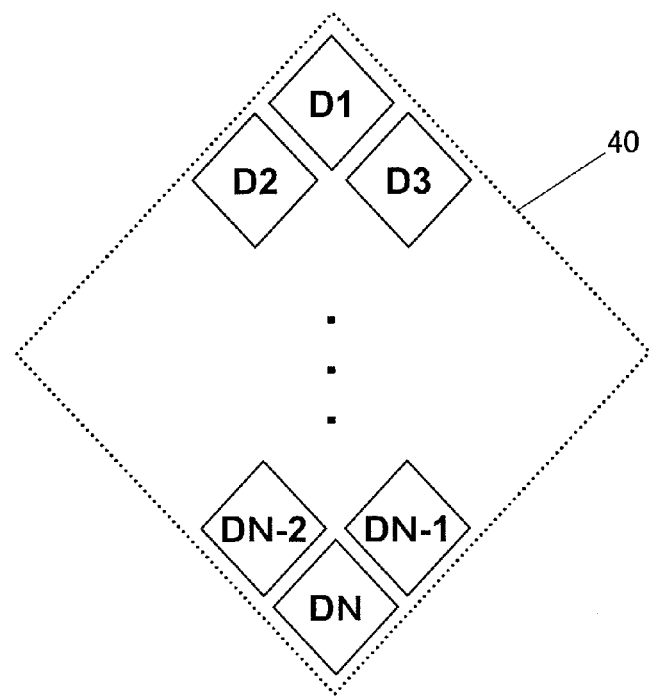
FIG. 11B Illustrates an exemplary arrangement of color filters in an image sensor according to the second exemplary embodiment.

FIG. 11B illustrates an exemplary arrangement of filters included in a single unit element 40 of the image sensor 1. Each single unit element 40 includes N photosensitive cells and N filters D1 through DN which face those photosensitive cells. Optionally, more than N filters may be included in a single unit element 40. Also, the arrangement of the transmitting filters shown in FIG. 11B is just an example and does not have to be used.

Figure 12A:
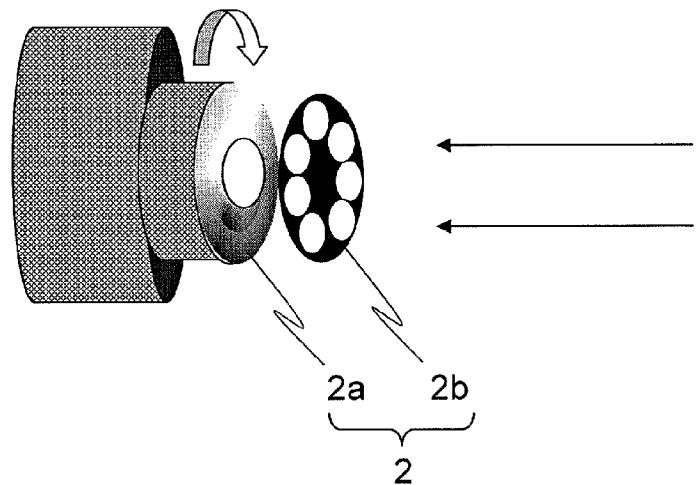
FIG. 12A Illustrates an example of a light-transmitting plate 2 with a rainbow pattern according to the second exemplary embodiment.

Hereinafter, an image capture device according to this embodiment will be described more specifically with a situation where N=7 taken as an example. As the light-transmitting plate 2, a rainbow pattern such as the one shown in FIGS. 12A and 12B may be used. In the example illustrated in FIG. 12A, the light-transmitting plate 2 is comprised of a filter 2a with a rainbow pattern and a shield plate 2b with seven transmitting areas (or openings). The filter 2a shown in FIG. 12A may be regarded as a set of seven kinds of filters with mutually different spectral transmittances which are connected together to form a ring. By rotating this filter 2a, the spectral transmittances at the respective openings can be changed. Alternatively, instead of using such a filter 2a with the rainbow pattern, filters with mutually different spectral transmittances may be attached to those seven openings of the shield plate 2b and the combination may be used as the light-transmitting plate 2 and rotated.

Figure 12B:
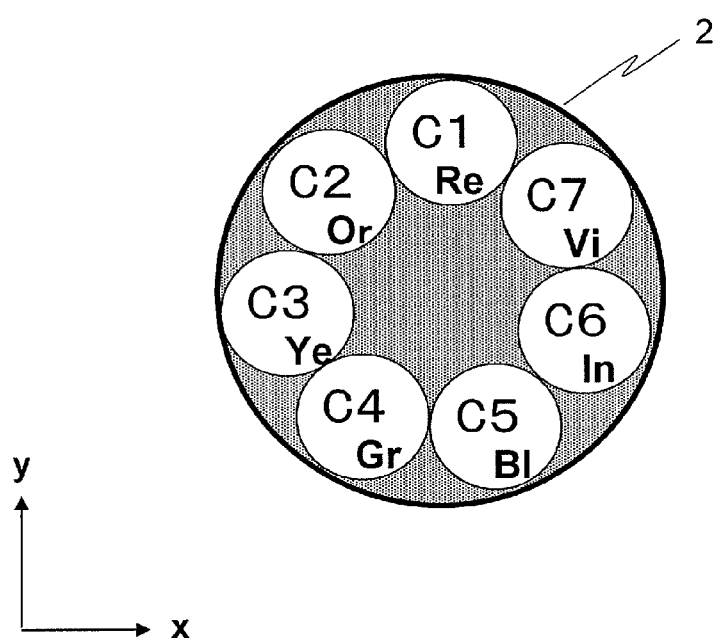
FIG. 12B Illustrates an example of a light-transmitting plate 2 according to the second exemplary embodiment when N=7.

As shown in FIG. 12B, those transmitting areas C1 through C7 are all circular ones and have the same area. However, such a shape or area does not always have to be adopted. In the initial state, filters which transmit light rays falling within the wavelength ranges of the colors red Re, orange Or, yellow Ye, green Gr, blue Bl, indigo In and violet Vi are supposed to be arranged at the positions of the transmitting areas C1 through C7. In addition, filters with those seven different spectral transmittances are also supposed to be arranged on the image sensor 1.

Signals representing the intensities of color component light rays to be transmitted through the respective transmitting areas C1 through C7 in the light that would be incident on the respective photosensitive cells included in a single unit element on the supposition that no filters are arranged at all are identified by Ci1 through Ci1, respectively. If the signals representing the quantities of light received at photosensitive cells that face the seven kinds of color filters in the image sensor 1 are identified by Res, Ors, Yes, Grs, Bls, Ins and Vis, then the quantities of signals observed at the respective photosensitive cells can be given by the following Equations (9) through (15):

$$Res = Ci1\Sigma TwTreT're + Ci2\Sigma TwTorT're + \\ Ci3\Sigma TwTyeT're + Ci4\Sigma TwTgrT're + \\ Ci5\Sigma TwTblT're + Ci6\Sigma TwTInT're + Ci7\Sigma TwTviT're \quad (9)$$

$$Ors = Ci\Sigma TwTreT'or + Ci2\Sigma TwTorT'or + \\ Ci3\Sigma TwTyeT'or + Ci4\Sigma TwTgrT'or + \\ Ci5\Sigma TwTblT'or + Ci6\Sigma TwTInT'or + Ci7\Sigma TwTviT'or \quad (10)$$

$$Yes = Ci1\Sigma TwTreT'ye + Ci2\Sigma TwTorT'ye + \\ Ci3\Sigma TwTyeT'ye + Ci4\Sigma TwTgrT'ye + \\ Ci5\Sigma TwTblT'ye + Ci6\Sigma TwTInT'ye + Ci7\Sigma TwTviT'ye \quad (11)$$

$$Grs = Ci1\Sigma TwTreT'gr + Ci2\Sigma TwTorT'gr + \\ Ci3\Sigma TwTyeT'gr + Ci4\Sigma TwTgrT'gr + \\ Ci5\Sigma TwTblT'gr + Ci6\Sigma TwTInT'gr + Ci7\Sigma TwTviT'gr \quad (12)$$

$$Bls = Ci1\Sigma TwTreT'bl + Ci2\Sigma TwTorT'bl + \\ Ci3\Sigma TwTyeT'bl + Ci4\Sigma TwTgrT'bl + \\ Ci5\Sigma TwTblT'bl + Ci6\Sigma TwTInT'bl + Ci7\Sigma TwTviT'bl \quad (13)$$

$$Ins = Ci1\Sigma TwTreT'In + Ci2\Sigma TwTorT'In + \\ Ci3\Sigma TwTyeT'In + Ci4\Sigma TwTgrT'In + \\ Ci5\Sigma TwTblT'In + Ci6\Sigma TwTInT'In + Ci7\Sigma TwTviT'In \quad (14)$$

$$Vis = Ci1\Sigma TwTreT'vi + Ci2\Sigma TwTorT'vi + \\ Ci3\Sigma TwTyeT'vi + Ci4\Sigma TwTgrT'vi + \\ Ci5\Sigma TwTblT'vi + Ci6\Sigma TwTInT'vi + Ci7\Sigma TwTviT'vi \quad (15)$$

In these equations, T're, T'or, T'ye, T'gr, T'bl, T'In and T'vi represent the respective spectral transmittances of red, orange, yellow, green, blue, indigo and violet filters arranged in the image sensor 1. Tre, Tor, Tye, Tgr, Tbl, Tin and Tvi represent the respective spectral transmittances of red, orange, yellow, green, blue, indigo and violet filters arranged in the light-transmitting plate 2. Tw represents the combined spectral transmittance of the lens 3 and the infrared cut filter 4 as in Equations (1) to (3). As in Equation (4), the following Equation (16) can be obtained based on the relations between the signals Res, Ors, Yes, Grs, Bls, Ins and Vis representing the light received at the image sensor 1, the signals Ci1 through Ci7 representing the intensities of light rays transmitted through the transmitting areas C1 through C7, and the spectral transmittances of the color filters:

$$\begin{pmatrix} Res \\ Ors \\ Yes \\ Grs \\ Bls \\ Ins \\ Vis \end{pmatrix} = \quad (16)$$

-continued $$\begin{pmatrix} Mx11 & Mx12 & Mx13 & Mx14 & Mx15 & Mx16 & Mx17 \\ Mx21 & Mx22 & Mx23 & Mx24 & Mx25 & Mx26 & Mx27 \\ Mx31 & Mx32 & Mx33 & Mx34 & Mx35 & Mx36 & Mx37 \\ Mx41 & Mx42 & Mx43 & Mx44 & Mx45 & Mx46 & Mx47 \\ Mx51 & Mx52 & Mx53 & Mx54 & Mx55 & Mx56 & Mx57 \\ Mx61 & Mx62 & Mx63 & Mx64 & Mx65 & Mx66 & Mx67 \\ Mx71 & Mx72 & Mx73 & Mx74 & Mx75 & Mx76 & Mx77 \end{pmatrix} \begin{pmatrix} Ci1 \\ Ci2 \\ Ci3 \\ Ci4 \\ Ci5 \\ Ci6 \\ Ci7 \end{pmatrix}$$

In Equation (16), the matrix elements Mx11 through Mx77 are values obtained by performing integration on Tw, the spectral transmittances of the transmitting areas on the light-transmitting plate 1, and the spectral transmittances of the color filters of the image sensor 1. That is to say, Mx11, Mx12, Mx13, Mx14, Mx15, Mx16 and Mx17 are ΣTwTreT're, ΣTwTorT're, ΣTwTyeT're, ΣTwTgrT're, ΣTwTblT're, ΣTwTInT're and ΣTwTviT're, respectively. In the same way, Mx21 to Mx27 are obtained by replacing T're in Mx11 to Mx17 with T'or Mx31 to Mx37 are obtained by replacing T're of Mx11 to Mx17 with T'ye. Mx41 to Mx47 are obtained by replacing T're of Mx11 to Mx17 with T'gr. Mx51 to Mx57 are obtained by replacing T're of Mx11 to Mx17 with T'bl. Mx61 to Mx67 are obtained by replacing T're of Mx11 to Mx17 with T'In. And Mx71 to Mx77 are obtained by replacing T're of Mx11 to Mx17 with T'vi.

By performing the inverse one of the arithmetic operation of Equation (16), signals Ci1 through Ci7 representing the intensities of light rays coming from seven directions can be obtained by performing a shooting session once. As a result, an image of a subject as viewed from over it can be obtained based on the signal Ci1 representing the intensity of a light ray passing through the transmitting area C1, for example. By performing shooting sessions at least seven times while rotating the light-transmitting plate 2 (360/7) degrees each time and by obtaining signals representing the intensities of light rays transmitted through the respective transmitting areas through arithmetic processing, the intensities of color component light rays that have come from the seven directions and passed through the filters with seven different spectral transmittances (i.e., 49 different intensities in total) can be obtained. As in Equations (6) to (8), a color image can be synthesized by choosing some of those obtained signals representing the intensities of the light rays so that the chosen signals represent the subject as viewed from the same direction. For example, the color information of the image when the subject is viewed from the position of the area C1 in the initial state is represented by the following Equation (17):

$$\begin{pmatrix} Res1 \\ Ors1 \\ Yes1 \\ Grs1 \\ Bls1 \\ Ins1 \\ Vis1 \end{pmatrix} = \quad (17)$$

-continued $$\begin{pmatrix} Mx11 & Mx12 & Mx13 & Mx14 & Mx15 & Mx16 & Mx17 \\ Mx21 & Mx22 & Mx23 & Mx24 & Mx25 & Mx26 & Mx27 \\ Mx31 & Mx32 & Mx33 & Mx34 & Mx35 & Mx36 & Mx37 \\ Mx41 & Mx42 & Mx43 & Mx44 & Mx45 & Mx46 & Mx47 \\ Mx51 & Mx52 & Mx53 & Mx54 & Mx55 & Mx56 & Mx57 \\ Mx61 & Mx62 & Mx63 & Mx64 & Mx65 & Mx66 & Mx67 \\ Mx71 & Mx72 & Mx73 & Mx74 & Mx75 & Mx76 & Mx77 \end{pmatrix} \begin{pmatrix} Ci1 \\ Cj2 \\ Ck3 \\ Cl4 \\ Cm5 \\ Cn6 \\ Co7 \end{pmatrix}$$

In Equation (17), Ci1, Cj2, Ck3, Cl4, Cm5, Cn6 and Co7 indicate signals representing the intensities of color component light rays transmitted through that position in the first through seventh shooting sessions. On the other hand, Res1, Ors1, Yes1, Grs1, Bis1, Ins1 and Vis1 respectively indicate signals representing the percentages of the colors red, orange, yellow, green, blue, indigo and violet components in the color image. A color image at any other position can also be obtained by performing a similar operation. By carrying out these processing steps, seven color multi-viewpoint images can be obtained for the seven transmitting areas.

In the embodiment described above, light rays coming from seven different directions are supposed to be imaged by rotating the light-transmitting plate 2 in seven stages. However, the rotating and shooting operations may also be performed in eight or more stages. In that case, although pieces of information about the intensities of light in a situation where additional shooting sessions have been carried out have already been obtained, the effect of obtaining a bright image even in a dark environment can be achieved by adding those pieces of information.

In the embodiments described above, the spectral transmittances of the respective transmitting areas C1 through C7 are supposed to be changed by rotating the light-transmitting plate 2. However, the spectral transmittances may also be changed by shifting the color filters either vertically or horizontally, instead of rotating the light-transmitting plate 2. Alternatively, the light-transmitting plate 2 may also be configured to change the spectral transmittances of a plurality of transmitting areas by providing either transparent filters or particular color filters for those transmitting areas of the light-transmitting plate 2 and by covering the transmitting areas with different color filters on a transmitting area basis from outside of the light-transmitting plate 2. Speaking more generally, in an embodiment of the present invention, the light-transmitting section may be driven in any way as long as the light-transmitting section is configured so that the N kinds of color filters of the light-transmitting section change their positions from one of N positions, which have been set in advance for the image sensor 1, after another every time a shooting session is carried out.

Figure 13:
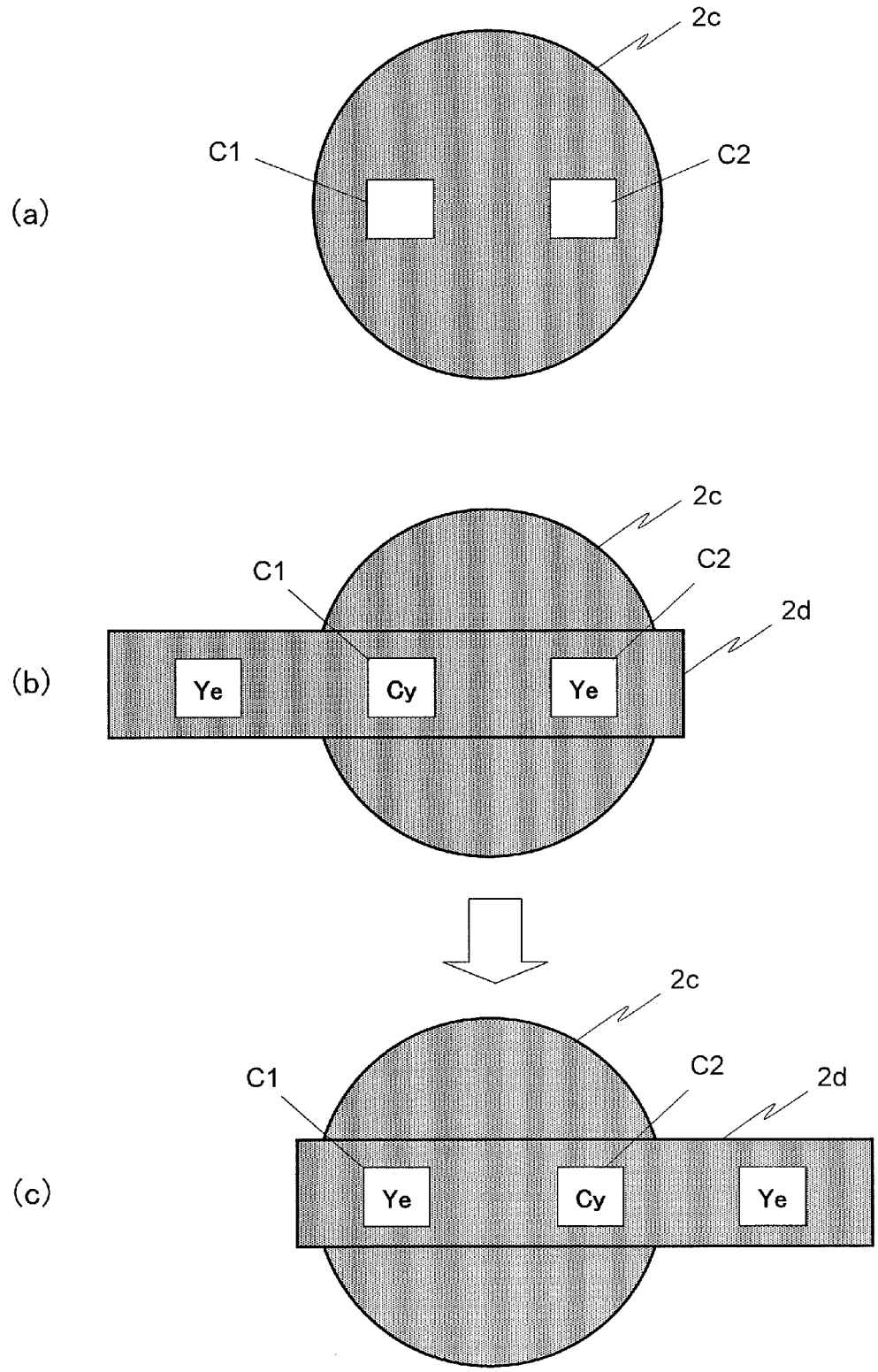
FIG. 13 Illustrates an exemplary configuration for changing the spectral transmittances of transmitting areas using sliding plate according to another exemplary embodiment.

For example, the configuration shown in FIG. 13 may be adopted to shift color filters in one direction. FIG. 13 illustrates an exemplary configuration for a light-transmitting plate 2c with two transmitting areas C1 and C2. A sliding plate 2d in which three color filters are arranged is attached to the light-transmitting plate 2c. And by sliding the sliding plate 2d, the spectral transmittances of the transmitting areas C1 and C2 can be changed. In the example illustrated in FIG. 13, a Cy filter is arranged at the center of the sliding plate 2d and Ye filters are arranged at both ends of the sliding plate 2d. As shown in FIG. 13(a), without the sliding plate 2d, the transmitting areas C1 and C2 are transparent. An image capturing session is carried out for the first time with the Cy filter arranged at the transmitting area C1 and with the Ye filter arranged at the transmitting area C2 as shown in FIG. 13(b). Next, an image capturing session is carried out for the second time with the Ye filter arranged at the transmitting area C1 and with the Cy filter arranged at the transmitting area C2 as shown in FIG. 13(c). In this example, each unit element of the image sensor 1 just needs to include two photosensitive cells and two color filters with different spectral transmittances which are arranged to face the photosensitive cells. By calculating signals representing the intensities of light ray components transmitted through the respective transmitting areas of the light-transmitting plate 2 by performing arithmetic processing on the photoelectrically converted signals supplied from the two photosensitive cells every time an image capturing session is carried out, multi-viewpoint images can be obtained. However, as only two transmitting areas are provided in this example, not color images but shade images will be obtained. Even if there are three or more transmitting areas, multi-viewpoint images can also be generated by a similar mechanism.

Figure 14:
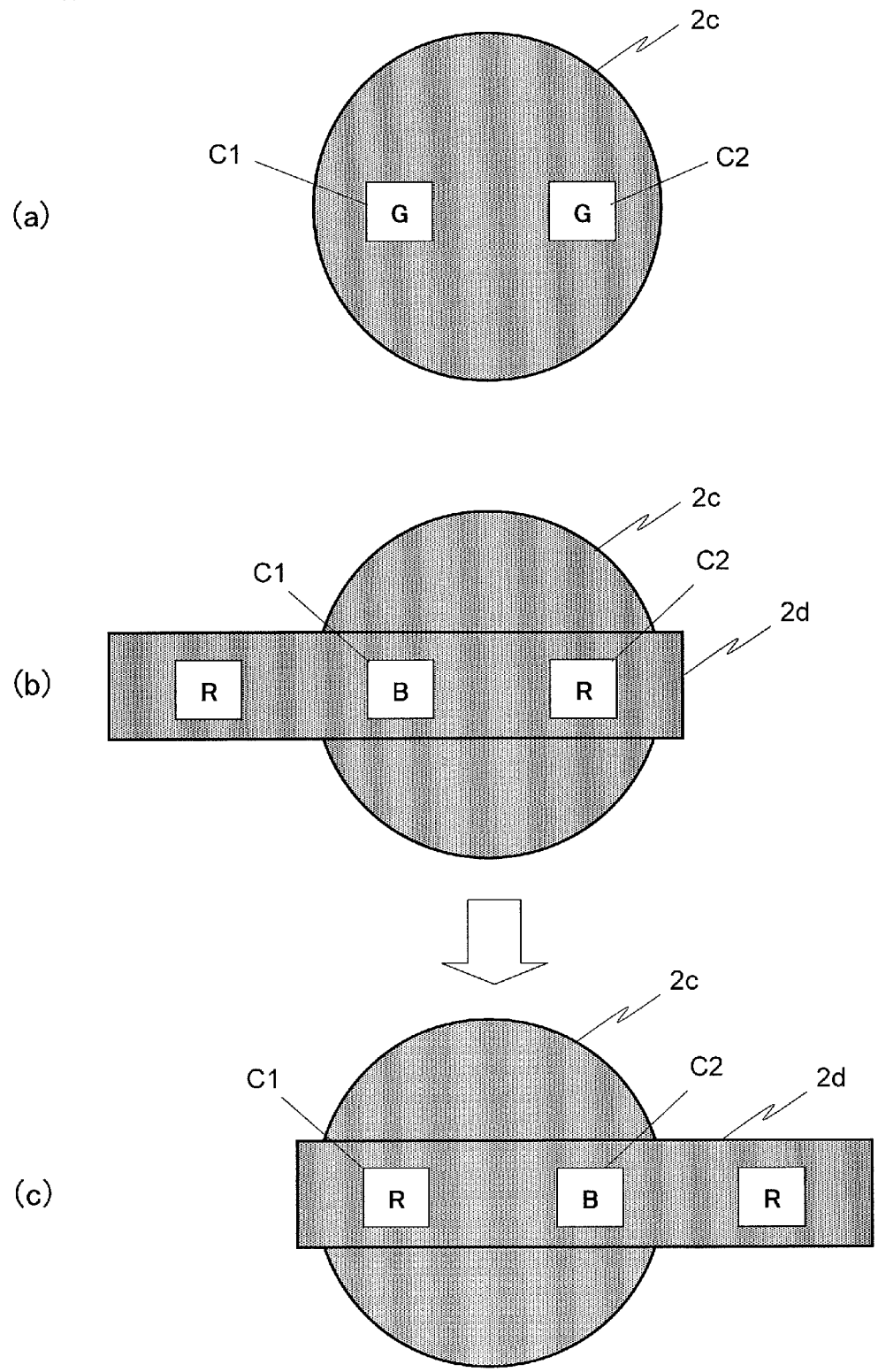
FIG. 14 Illustrates another exemplary configuration for changing the spectral transmittances of transmitting areas using a sliding plate according to another exemplary embodiment.

Optionally, the configuration shown in FIG. 14 may be adopted instead of the one shown in FIG. 13. In the configuration shown in FIG. 14, without the sliding plate 2d, the transmitting areas C1 and C2 are not transparent but G filters. In that case, a B filter is arranged at the center of the sliding plate 2d and R filters are arranged at both ends of the sliding plate 2d. In the state shown in FIG. 14(b), the area C1 has the same property as a Cy filter, and the area C2 has the same property as a Ye filter. On the other hand, in the state shown in FIG. 14(c), the area C1 has the same property as a Ye filter, and the area C2 has the same property as a Cy filter. Consequently, this configuration can also achieve quite the same effect as the one shown in FIG. 13.

An image capture device according to any of the embodiments described above generates an image by performing signal arithmetic operations on a photoelectrically converted signal that has been obtained by capturing an image. However, such processing of generating an image by signal arithmetic operations may also be carried out by another device which is provided independently of the image capture device. For example, even if a signal that has been obtained by an image capture device including the image capturing section 100 of the embodiment described above is loaded into another device (image processor) to get a program defining the signal arithmetic processing described above executed by a computer built in that image processor, the effects of the embodiments described above can also be achieved.

Figure 15:
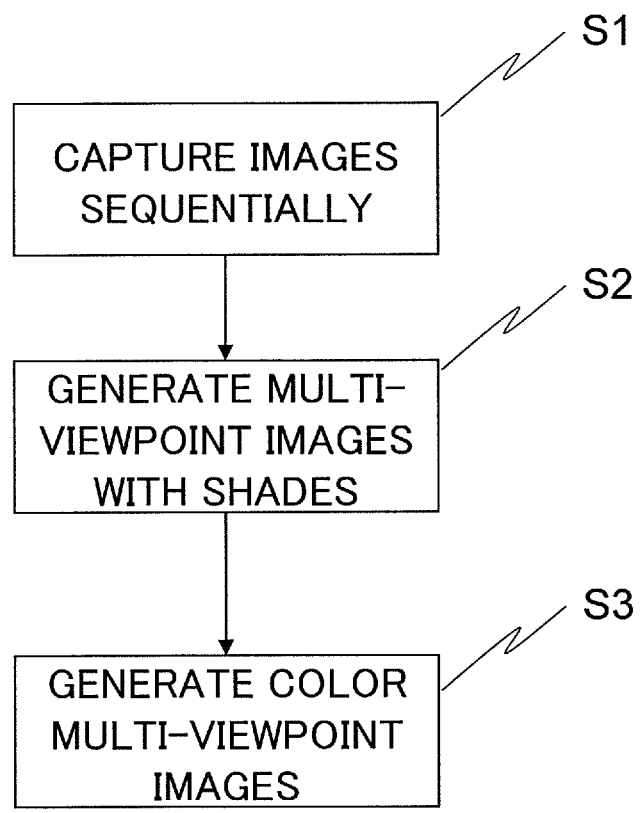
FIG. 15 A flowchart showing an exemplary flow of a series of operations from image capturing through color multi-viewpoint image generation according to another exemplary embodiment.
Figure 16:
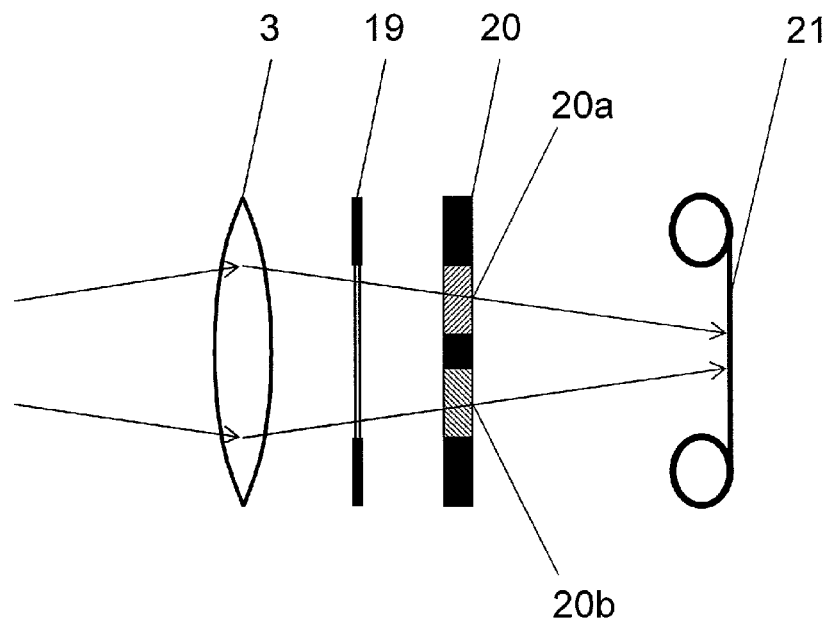
FIG. 16 Illustrates the configuration of an image capturing system according to Patent Document No. 1.
Figure 17:
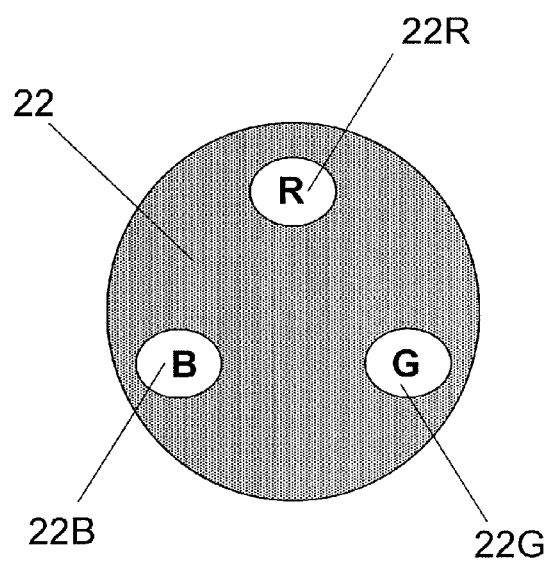
FIG. 17 Illustrates the appearance of a light beam confining plate according to Patent Document No. 2.
Figure 18:
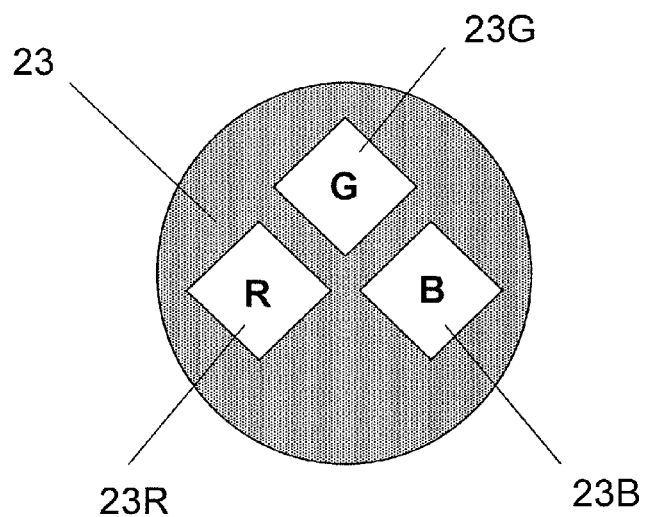
FIG. 18 Illustrates the appearance of a light beam confining plate according to Patent Document No. 3.

FIG. 15 is a flowchart showing an exemplary flow of a series of operations from image capturing through image generation to be carried out by such an image capture device and another device. First of all, in Step S1, the image capture device performs image capturing sessions a number of times (capture images sequentially) with the positions of the multiple kinds of filters in the light-transmitting section 2 changed. Next, in Step S2, the image processor generates shade images produced by light ray components that have been transmitted through the respective transmitting areas of the light-transmitting section 2 based on multiple pixel signals obtained by capturing images (generate multi-viewpoint images with shades). Subsequently, in Step S3, the image processor synthesizes together the multi-viewpoint images with shades by performing the same arithmetic operation as Equation (17), thereby generating color multi-viewpoint images (generate color multi-viewpoint images). By performing these processing steps, the image capture device can be configured so that the image capturing function and image processing function are carried out by two different devices.

INDUSTRIAL APPLICABILITY

A 3D image capture device according to an aspect of the present invention can be used effectively in any camera that ever uses a solid-state image sensor. Examples of those cameras include consumer electronic cameras such as digital still cameras and digital camcorders and solid-state surveillance cameras for industrial use.

REFERENCE SIGNS LIST 1 solid-state image sensor
1a solid-state image sensor's imaging area
2, 2a, 2b, 2c light-transmitting plate (light-transmitting section)
2d sliding plate
3 optical lens
4 infrared cut filter
5 signal generating and receiving section
6 sensor driving section
7 image signal generating section
8 interface section
9 rotating and driving section
19 lens diaphragm
20, 22, 23 light beam confining plate
20a color filter which transmits red-based light ray
20b color filter which transmits blue-based light ray
21 photosensitive film
22R, 23R light beam confining plate's R ray transmitting area
22G, 23G light beam confining plate's G ray transmitting area
22B, 23B light beam confining plate's B ray transmitting area
30 memory
40 unit element
100 image capturing section
110 color filter
120 photosensitive cell
200 signal processing section

The invention claimed is:

1. A 3D image capture device comprising: a light-transmitting optic including N different kinds of first filters, where N is an integer that is equal to or greater than two, which are arranged so that light rays are incident on those filters in parallel with each other and of which transmittances have mutually different wavelength dependences;
an image sensor which is arranged so as to receive the light that has been transmitted through the light-transmitting optic and which includes a photosensitive cell array and a filter array that is arranged to face the photosensitive cell array, each of the photosensitive cell array and the filter array being made up of a plurality of unit elements, each said unit element including N photosensitive cells and N second filters which are arranged to face the N photosensitive cells, respectively, and of which the transmittances have mutually different wavelength dependences, wherein the N kinds of first filters have a different combination of colors from the N second filters;
an optical lens which produces an image on the image capturing plane of the image sensor; and
a driver which drives the light-transmitting optic so that image capturing sessions are carried out M times sequentially, where M is an integer that is equal to or greater than N, and that each of the N kinds of first filters changes its positions from one of N positions after another every time the image capturing session is carried out, the N positions having been set in advance with respect to the image sensor; and
a processor that generates N multi-viewpoint images that are associated with the N positions based on photoelectrically converted signals to be supplied from the N photosensitive cells that are included in each said unit element when image capturing sessions are carried every M times,
wherein the processor generates M×N image signals representing light ray components that have passed through the N positions based on the photoelectrically converted signals to be supplied from the N photosensitive cells that are included in each said unit element when image capturing sessions are carried every M times, and synthesizes those N×M image signals generated together, thereby generating N color multi-viewpoint images associated with the N positions.

2. The 3D image capture device of claim 1, wherein the N kinds of first filters are designed so that a light ray with an arbitrary wavelength, which is included in visible radiation, is transmitted through at least one kind of first filter among the N kinds of first filters, the at least one kind of first filter having a transmission wavelength range that is broader than the wavelength range of a primary color.

3. The 3D image capture device of claim 1, wherein three out of the N kinds of first filters have their transmission wavelength ranges designed to agree with three out of colors cyan, magenta, yellow, red, blue and green wavelength ranges.

4. The 3D image capture device of claim 1, wherein N is equal to three such that there are three different kinds of first filters, three second filters, each said unit element includes three photosensitive cells, and each of the three kinds of first filters changes its positions from one of three positions, and
wherein the N kinds of first filters have their transmission wavelength ranges designed to agree with colors cyan, magenta and yellow wavelength ranges, respectively, and
wherein the N second filters have their transmission wavelength ranges designed to agree with colors red, blue and green wavelength ranges, respectively.

5. The 3D image capture device of claim 1, wherein in the light-transmitting optic, the N kinds of first filters are arranged so that the first filters are all located at the same distance from the center of the light-transmitting optic and that there is an equal distance between any two adjacent ones of the first filters.

6. The 3D image capture device of claim 1, wherein the driver rotates the light-transmitting optic on the center of the light-transmitting optic, thereby changing the positions of each of the N kinds of first filters from one of those N positions after another every time an image capturing session is carried out.

7. An image processor that generates multi-viewpoint images based on signals that have been obtained by the 3D image capture device of claim 1,
wherein the image processor generates N multi-viewpoint images that are associated with the N positions based on photoelectrically converted signals to be supplied from the N photosensitive cells that are included in each said unit element of the image sensor when image capturing sessions are carried every M times.

8. The image processor of claim 7, wherein the image processor generates M×N image signals representing light ray components that have passed through the N positions based on the photoelectrically converted signals to be supplied from the N photosensitive cells that are included in each said unit element when image capturing sessions are carried every M times, and synthesizes those N×M image signals generated together, thereby generating N color multi-viewpoint images associated with the N positions.

9. An image processing method for generating multi-viewpoint images using the 3D image capture device of claim 1, the method comprising:
   causing the driver to drive the light-transmitting optic to carry out M sequential image capturing sessions, wherein the N kinds of first filters change position from one of N positions after another every time the image capturing sessions is carried out,
   generating N multi-viewpoint images that are associated with the N positions based on the photoelectrically converted signals supplied from the N photosensitive cells included in each said unit element of the image sensor when image capturing sessions are carried every M times.

10. The image processing method of claim 9, wherein the generation of the N multi-viewpoint images includes:
   causing the driver to generate M×N image signals representing light ray components that have passed through the N positions based on the photoelectrically converted signals to be supplied from the N photosensitive cells that are included in each said unit element when image capturing sessions are carried every M times, and
   synthesizing those N×M image signals generated together, thereby generating N color multi-viewpoint images associated with the N positions.

11. A non-transitory computer-readable medium which stores a computer program to be executed by a computer for generating multi-viewpoint images based on signals that have been obtained by the 3D image capture device of claim 1, wherein the computer program:
   causes the driver of the 3D image capture device of claim 1 to drive the light-transmitting optic to carry out M sequential image capturing sessions, wherein the N kinds of first filters change position from one of N positions after another every time the image capturing sessions is carried out,
   generates N multi-viewpoint images that are associated with the N positions based on the photoelectrically converted signals supplied from the N photosensitive cells included in each said unit element of the image sensor when image capturing sessions are carried every M times.

12. The non-transitory computer-readable medium of claim 11, wherein the generation of the N multi-viewpoint images includes:
   causing the driver to generate M×N image signals representing light ray components that have passed through the N positions based on the photoelectrically converted signals to be supplied from the N photosensitive cells that are included in each said unit element when image capturing sessions are carried every M times, and
   synthesizing those N×M image signals generated together, thereby generating N color multi-viewpoint images associated with the N positions.

* * * * *